United States Patent

[11] 3,626,108

[72] Inventors William A. Oswald; Lloyd H. Yost, both of Rochester; Frank Y. Shaw, Honeoye Falls; William F. Bartlett, Rochester, all of N.Y.

[21] Appl. No. 880,102
[22] Filed Nov. 26, 1969
[45] Patented Dec. 7, 1971
[73] Assignee Stromberg-Carlson Corporation Rochester, N.Y.

[54] SYSTEM AND PROCESS FOR CONTROLLING AN AUTOMATIC TELEPHONE EXCHANGE
22 Claims, 21 Drawing Figs.

[52] U.S. Cl. .......... 179/18 ES
[51] Int. Cl. .......... H04m 3/00
[50] Field of Search .......... 179/18 ES

[56] References Cited
UNITED STATES PATENTS

| | | | |
|---|---|---|---|
| 3,483,524 | 12/1969 | DeBuck | 179/18 UX ES |
| 3,487,170 | 12/1969 | Pearce | 179/18 ES |
| 3,517,123 | 6/1970 | Harr | 179/18 ES |

*Primary Examiner*—Ralph D. Blakeslee
*Attorney*—Craig, Antonelli and Hill

ABSTRACT: System and process for controlling an automatic telephone exchange to effect line/trunk scan, loop analysis and connection between the available networks in response thereto.

PATENTED DEC 7 1971 3,626,108

SHEET 01 OF 12

INVENTORS
WILLIAM A. OSWALD,
LLOYD H. YOST,
FRANK Y. SHAW and
BY WILLIAM I. BARTLETT Craig, Antonelli, Stewart & Hill
ATTORNEYS

SYSTEM AND PROCESS FOR CONTROLLING AN AUTOMATIC TELEPHONE EXCHANGE

The present invention relates in general to automatic telephone systems, and more particularly to a process and apparatus for effecting control over the operation of a telephone exchange.

A basic requirement for any telephone system is the analysis of the loops or wires that connect telephones or trunks to the equipment which switches the call to its proper destination. The opened or closed states of a loop along with the time interval that the loop is opened or closed all have a special meaning in the overall analysis. Thus, the particular manner of and apparatus for effecting such supervisory control determines the degree of efficiency of and capabilities for providing the required control.

In accordance with the present invention there is provided a process and apparatus for effecting control over a telephone exchange, which is basically broken down into three main operations including line/trunk scan, loop analysis, and network connection. These three operations serve to detect requests for service, determine the substance of the request including the destination of a requested call, and effect the necessary control and interconnection to establish or satisfy the subscriber request.

An important feature of the present invention is the provision of register means for storing and facilitating the manipulation of the data required for providing the necessary control over the operation of the telephone exchange and in the manner in which this data is manipulated and utilized to provide efficiency and dependability of operation.

These other features and advantages of the present invention will become more apparent from the following detailed description thereof, when taken in conjunction with the accompanying drawings, wherein:

FIG. 1 is a schematic block diagram of an automatic data processing system to which the apparatus and process in accordance with the invention is applicable;

FIGS 2*a*, 2*b* and 2*c*, when combined, provide a more detailed schematic diagram of the system of FIG. 1, as provided in control of a telephone exchange;

FIG. 3 is a schematic diagram illustrating the functional association of systems and data areas for operation of the system of FIG. 1;

FIGS. 4*a*, 4*b*, 4*c* and 4*d* are schematic diagrams of selected data areas in the memory of the system of FIG. 1;

Figure 7A:
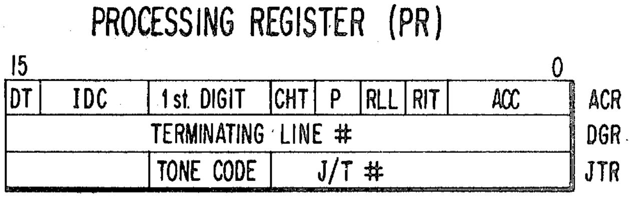
Figure 7B:
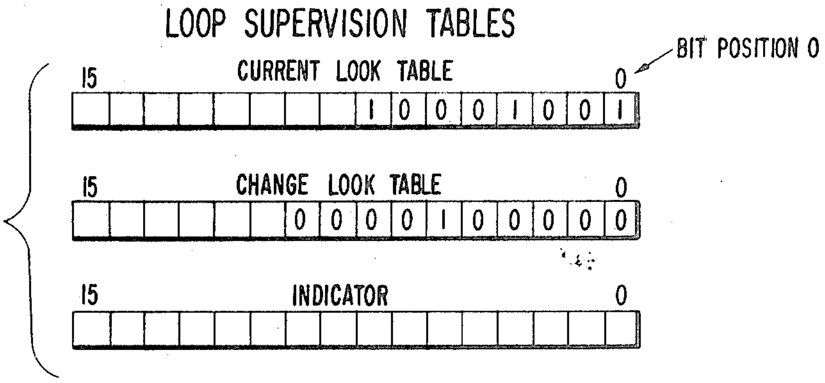
Figures 8A, 8B:
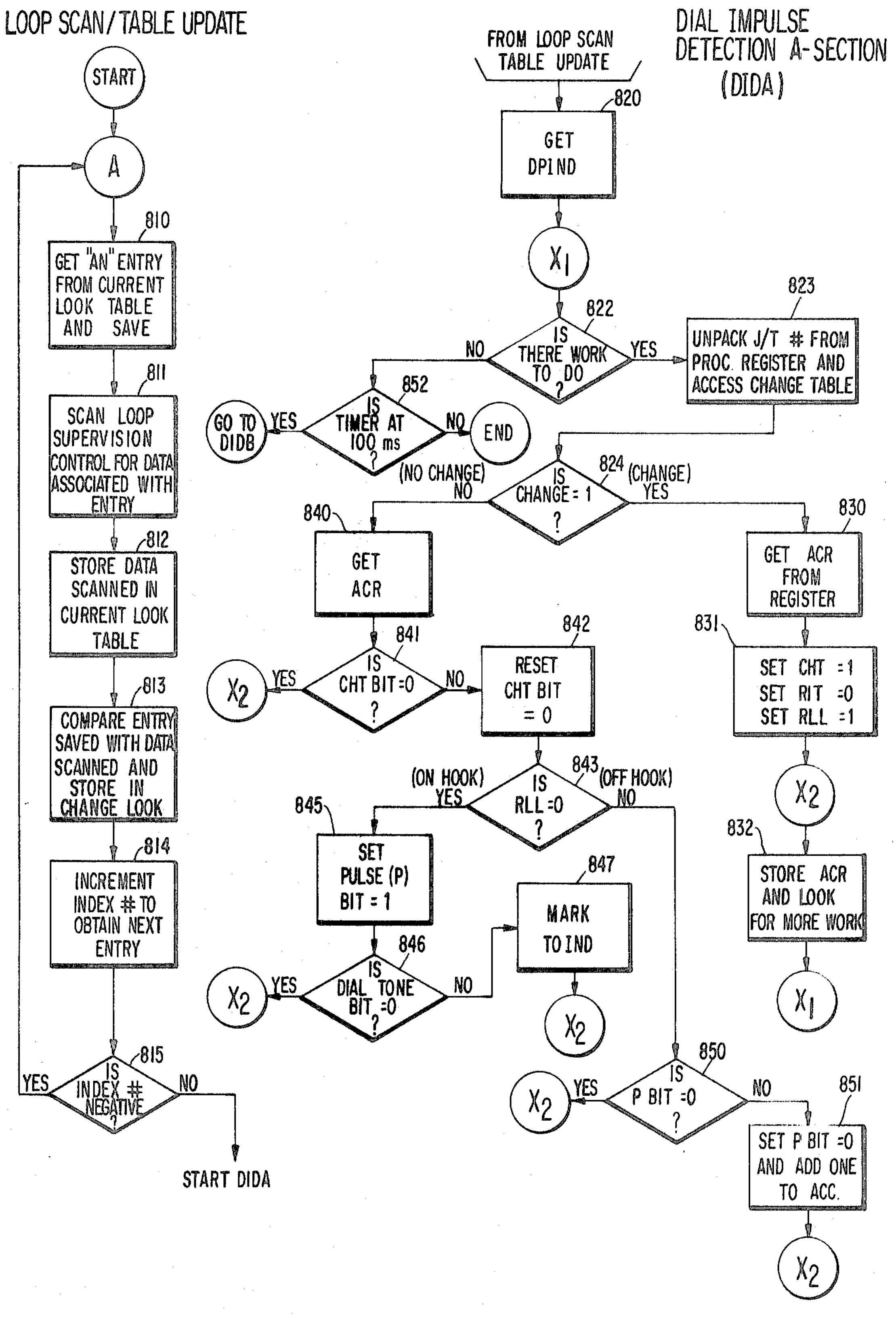
Figure 8C:
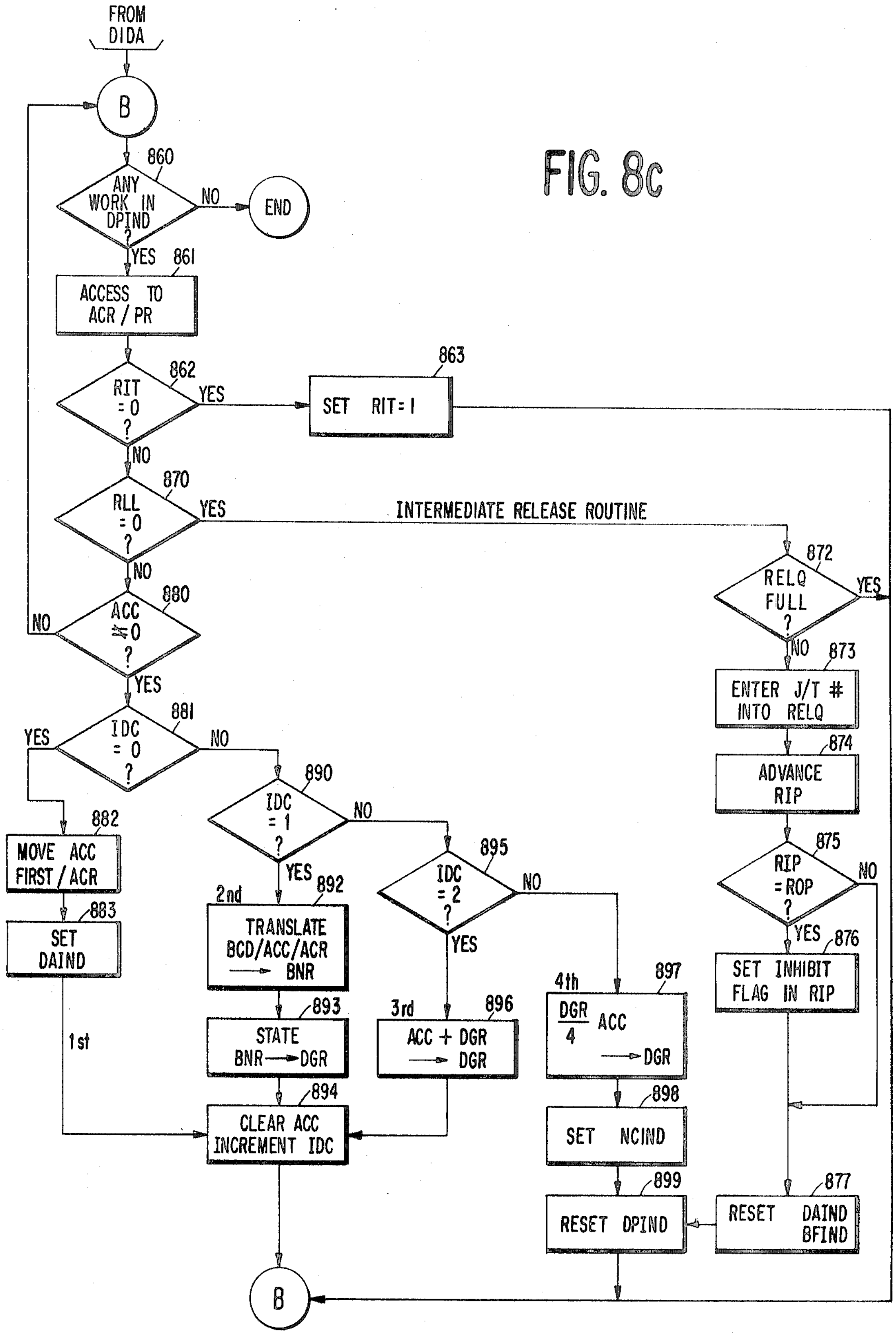
Figure 9A:
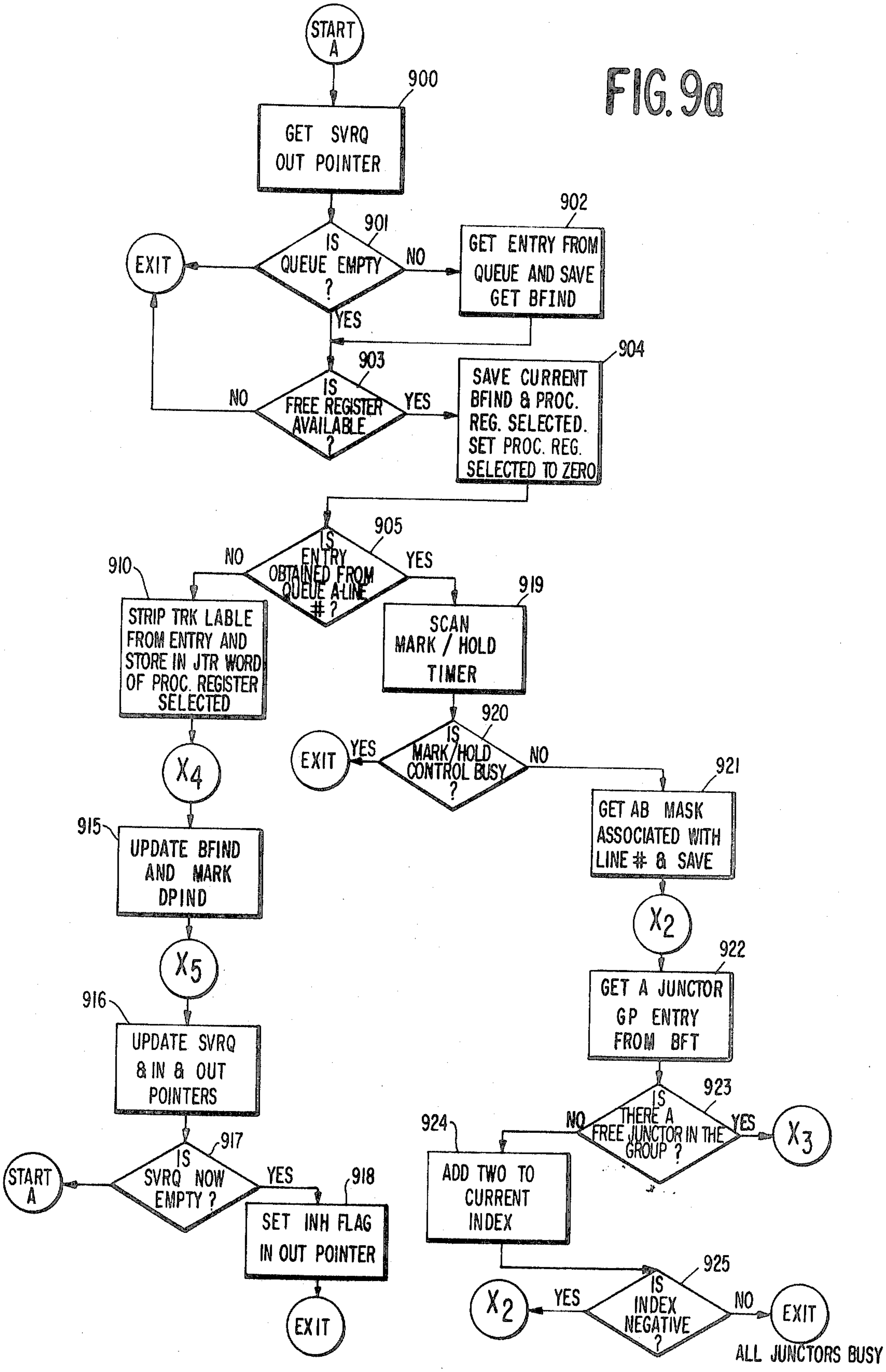
Figures 9B, 10B, 10C:
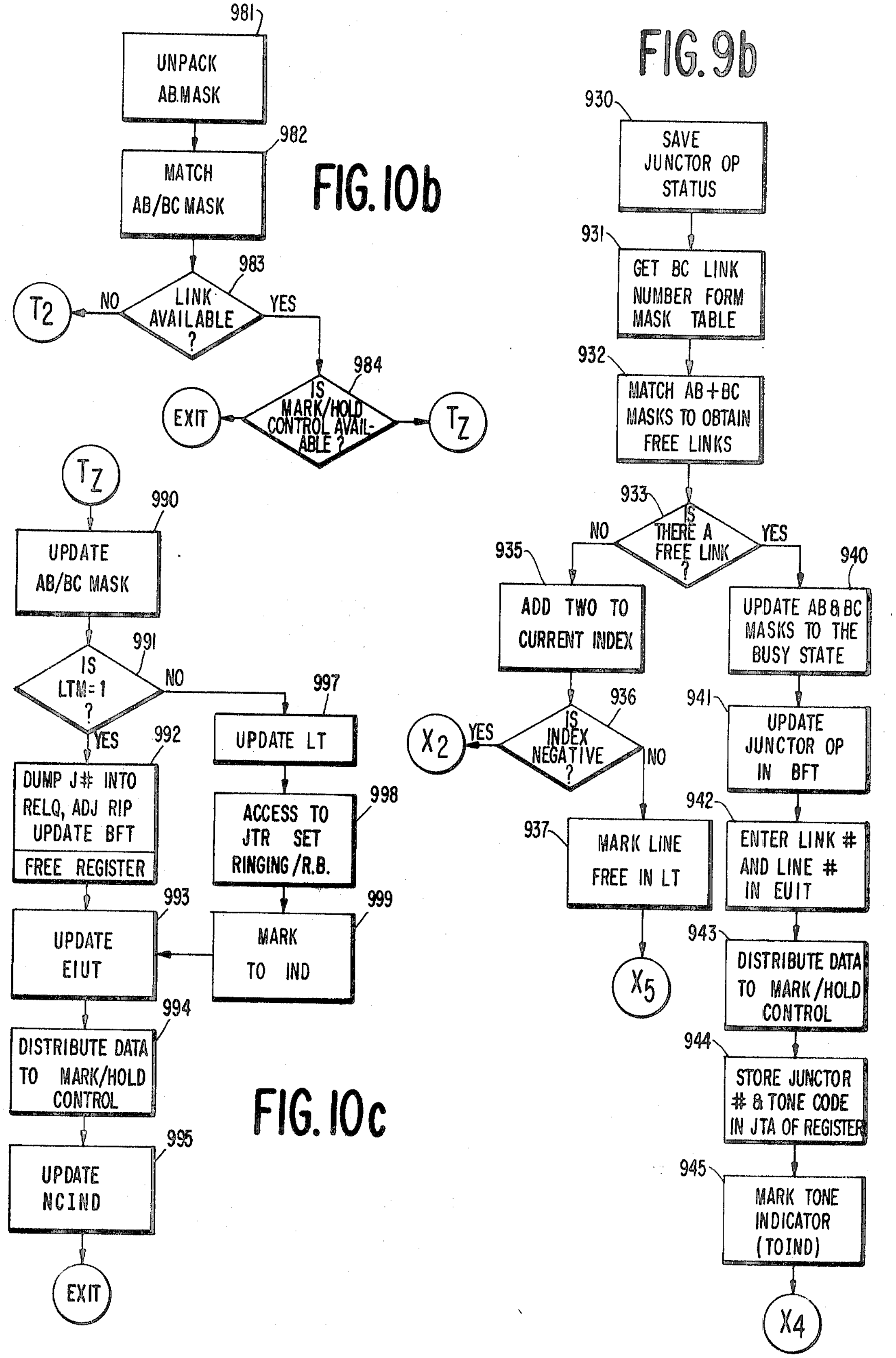
Figure 10A:
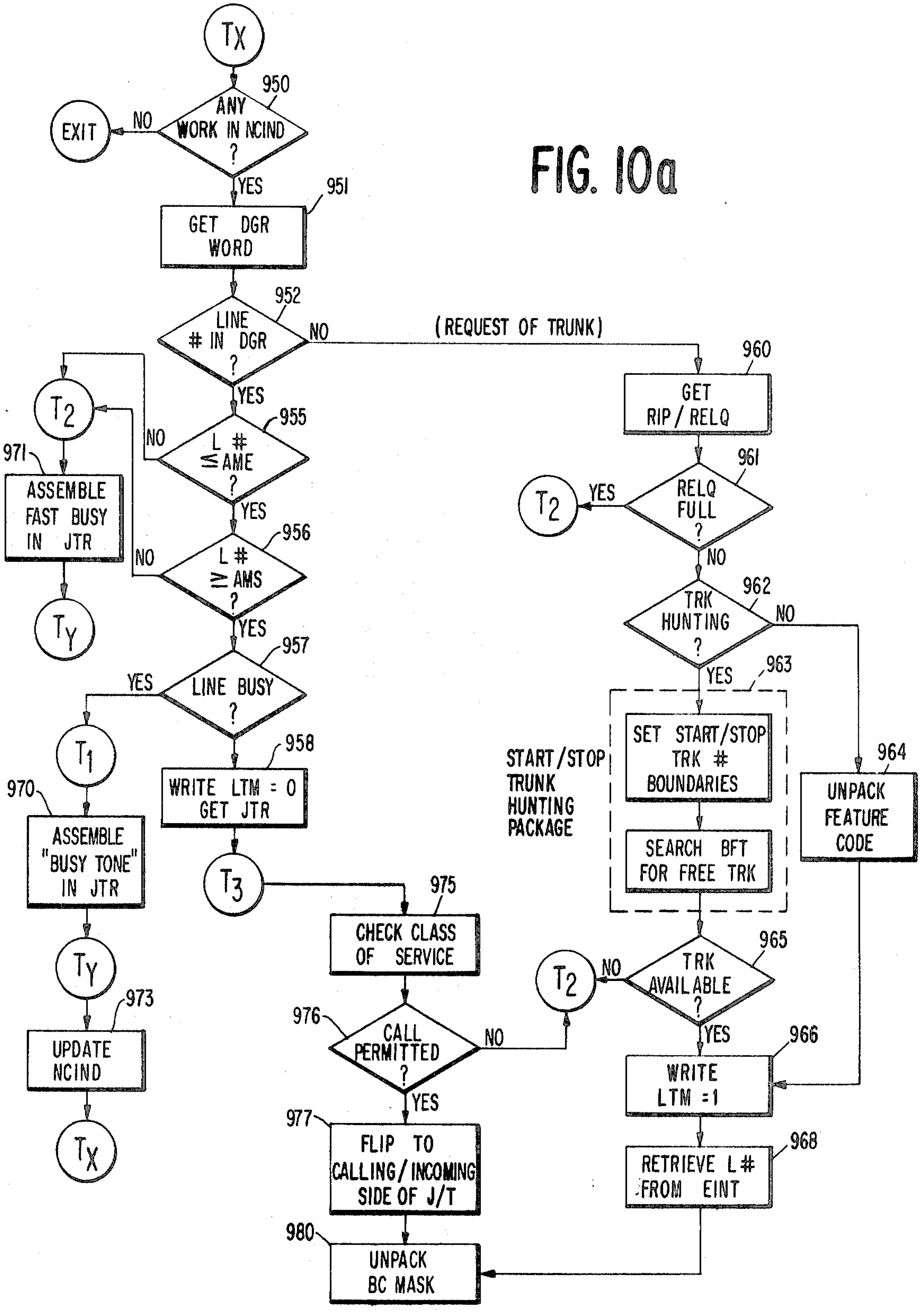

FIG. 7*a* and 7*b* are schematic diagrams of selected data areas in the memory;

FIGS. 8*a*, 8*b* and 8*c* are flow charts of the loop scan/table update and dial impulse detection A and B sections, respectively;

FIGS 9*a* and 9*b* are flow charts of the network connection-calling process provided by the system of the present invention; and FIGS 10*a*, 10*b* and 10*c* are flow charts of the network connection-terminating process provided by the system of the present invention.

The following description relates an exemplary embodiment of the invention to the control of a telephone exchange; however, it will be apparent from this description that the present invention is equally applicable to control of other systems without loss of advantage or the necessity of material change or alternation beyond that obvious to one or ordinary skill in the art.

Figure 1:
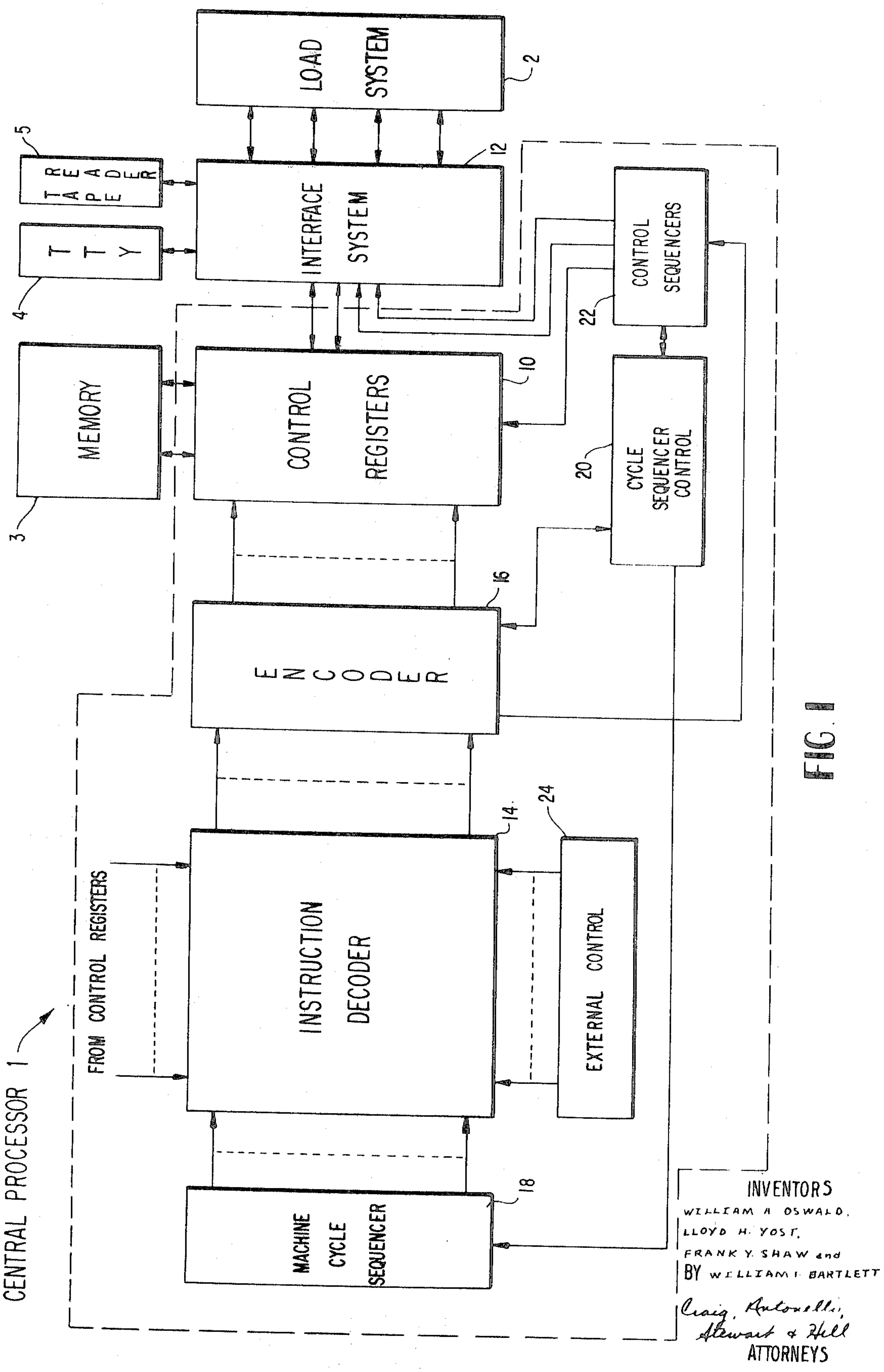

In the basic block diagram of FIG. 1, a central processor 1 operates to provide the necessary control signals for controlling the load system 2 in accordance with the conditions existing in the load system, which are detected and stored in the memory 3, and pursuant to a set of instructions forming one or more programs also stored in the memory 3. The introduction of data into the central processor is accomplished through use of, for example, a teletype unit 4 and a tape reader 5, which permit the introduction or alternation of programs and individual instructions and make possible the interruption of the operation of the central processor for purposes of introducing special requests for service as required.

The central processor 1 consists of a combination of elements which analyze data received from the load system, determine from the instructions stored in the memory 3 the necessary steps required in view of the analyzed data, determine the sequence of steps to be performed within the selected instruction and generate the necessary control signals for application in control of the load system 2. Data is transferred to the load system 2 by way of a series of control registers 10 a peripheral bus 11 and an interface system 12. The series of control registers 10 provide the means for introducing into or deriving data and instructions from the memory 3 and include the necessary registers and computing elements for performing analysis on the data derived from the load system 2 and from the memory 3 in accordance with the programs stored in the memory 3 and for generating the necessary control signals which are applied through the peripheral bus 11 to the interface system 12 in control of the load system 2.

Operation of the control registers 10 take two basic forms, that is, an instruction or instructions derived from the memory 3 in coded form indicating the necessary control required for a given set of circumstances must be decoded to a form representing a plurality of individual operative steps through which the various control registers are driven so as to achieve the desired output control to the load system 2 and the proper sequence of the required steps must be determined and the operation of the individual control registers must be regulated in accordance with this predetermined sequence. Accordingly, the central processor 1 includes an instruction decoder 14 which receives a coded instruction from the control registers 10 and decodes this coded instruction by providing a series of outputs representative of a plurality of individual operation cycles which make up the given instruction. These operation cycles in turn consist of a plurality of steps which are determined by an encoder 16 connected to the output of the instruction decoder 14. Outputs representing the individual steps of each cycle forming an instruction are then applied from the encoder 16 to the control registers 10 in control thereof.

The sequence in which the respective steps of each cycle of a given instruction are applied to the control registers 10 is determined by a machine cycle sequencer 18 under control of a cycle sequencer control 20. The machine cycle sequencer 18 determines the sequence of the outputs enabled from the instruction decoder 14 and effectively steps from one cycle to the next cycle in sequence upon indication from the cycle sequencer control 20 that all of the steps of a given cycle have been completed so that the next cycle may be initiated. The cycle sequencer control 20 also controls a plurality of control sequencers 22 in response to control signals received from the encoder 16, the control sequencers 22 providing for control operation of the control registers 10 and interface system 12 as required for various steps of the cycles of a given instruction.

Figure 2A:
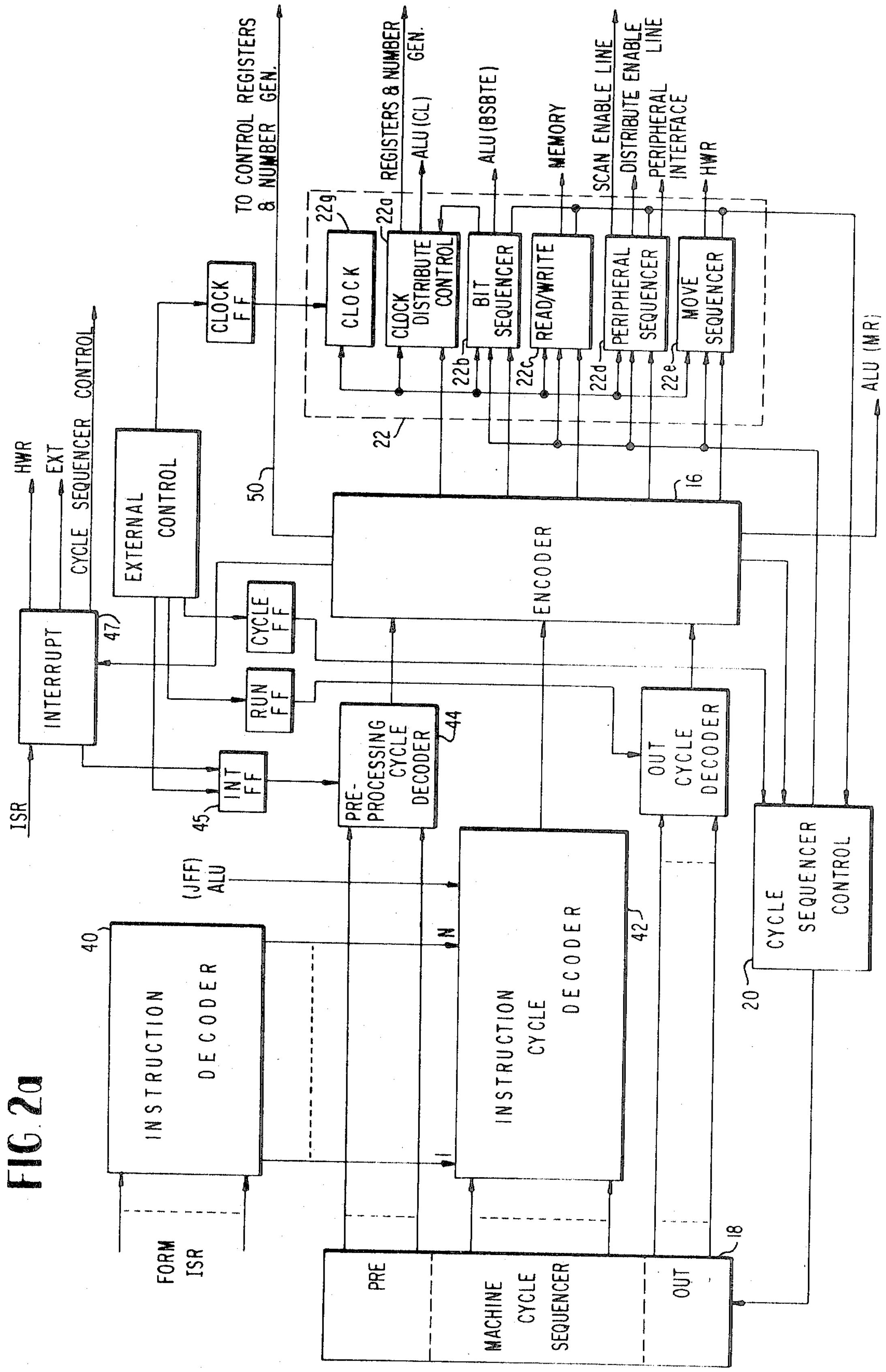

The general control system of FIG. 1 is illustrated in greater detail in connection with FIGS. 2*a*, 2*b* and 2*c*, which together provide a system for effecting control over the operation of a telephone exchange. Looking first to FIG. 2*b*, which illustrates the control registers 10 associated with the memory 3, it is seen that nine registers are provided for the manipulation and control of data and instructions, and an arithmetic and logic unit ALU is provided for transfer and computation of the data as required by the stored instructions.

The control registers include a memory address register MAR which is primarily used to present an address to the memory 3 indicating the storage position in the memory into which data is written or from which data is written or from which data is derived. There is also provided a memory buffer register MBR which stores the data to be inserted into the memory or extracted therefrom at the memory position determined by the address stored in the memory address register MAR. In order to write into the memory, the address is transferred into the memory address register MAR and the contents to be written into the memory are transferred into the memory buffer register MBR. Then, control from the read/write sequencer effects the necessary transfer of data into the memory at the proper memory location. To read data from the memory, a similar operation occurs with the data being extracted from the memory at the location determined by the address in the memory address register MAR, the data being transferred to the memory buffer register MBR upon application of control to the memory from the read/write sequencer.

The control registers also include an instruction address register IAR which contains the address of the instruction about to be executed or the address of the instruction which has just been executed. This register is provided in association with the instruction register ISR which contains the instruction being executed, which instruction is derived from the series of instructions forming the plurality of programs stored in the memory 3.

A hardware register HWR performs a plurality of functions including the storage of instructions received in parallel from the instruction register ISR for various operations and the storage of the address of peripheral equipment and certain information relating to interrupts.

As indicated above, when the contents of an address in the memory is desired, a read command is given. Similarly, when the status of a peripheral device is desired, a scan command is given. The address of the desired peripheral device is first placed into the hardware register HWR and then gated through a peripheral address interface 35 to present the address to the peripheral address decoder in the interface equipment. Upon sending out the scan pulse or command from the peripheral sequencer forming another of the control sequencers 22, the status of the peripheral device appears on the peripheral data bus and is entered through a peripheral data interface 36 into the scan register SNR. On the other hand, when data is to be sent to a peripheral device, the address of the peripheral device is placed in the hardware register HWR and the data to be sent to the peripheral device is placed in a distribute register DTR. Upon generation of a distribute pulse by the peripheral sequencer, the data stored in the distribute register DTR is then outpulsed to the peripheral equipment.

Finally, the control registers include a pair of programable or addressable registers X and Y, which registers are utilized for the various operations specified in the stored programs, with the execution of instructions not serving to change the contents of these registers unless the instruction explicitly indicates that change of the contents is required.

The arithmetic and logic unit ALU is a unit which performs the necessary arithmetic and logic functions attendant to the carrying out of the programs stored in the memory. This unit includes two data inputs designated A and B and a single data output designated C. There are two buses 30 and 31 that lead to the unit ALU, with one of the buses 30 connecting the output of various registers to the A input and the other bus 31 connecting various registers to the B input to the unit. Thus the flow of data generally from and to the various control registers occurs in a clockwise manner via the buses 30 or 31 to the inputs A or B of the unit ALU and out the outputs C via the bus 32 to the input of the registers. In this regard, it should be noted that the instruction register ISR and the distribute register DTR are not connected to either input of the unit ALU. Data is never transferred serially out of the instruction register ISR but is transferred in parallel to the instruction decoder or to the hardware register HWR. With regard to the distribute register DTR, since this register is used only to distribute information to the peripheral data bus in parallel, no data is transferred serially out of this register. With the exception of the hardware register HWR, the scan register SNR and the memory buffer register MBR, registers can only be loaded by serially transferring data through the arithmetic and logic unit ALU.

There is also included in combination with the control registers a number generator 34 which is connected to the data buses 30 and 31 and is used to date certain numbers into the inputs A or B of the unit ALU when requested by the encoder 16.

FIG. **2*a* provides the instructor decoder/encoder and timing arrangement for the processor 1. This section tells the central control and the control registers shown in FIG. 2*b* what they are supposed to do and when they are supposed to do it. The contents of the instruction register which represent an instruction in a binary code are applied to the instruction decoder 40 which decodes the instruction by enabling one out of N leads that goes to the instruction cycle decoder 42. Each of the output leads 1–N of the instruction decoder 40 therefore represents a single unique one of the instructions forming the various programs stored in the memory. As indicated previously, each instruction includes one or more cycles of operating functions with each cycle being broken down into one or more operating steps. Thus, the first step in determining the required operations which must be performed in response to a particular instruction is to determine the sequence of cycles required for the particular instruction. The instruction cycle decoder 42 determines those cycles which make up a particular instruction in response to receipt of an enabling signal on one of the lines 1–N from the instruction decoder 40**.

Since each cycle of an instruction must be performed in a particular sequence, the main suction of the machine cycle sequencer 18 provides a plurality of outputs to the instruction cycle decoder 42, which output leads are enabled sequentially in response to control from the cycle sequencer control 20 so that the output from the instruction cycle decoder 42 will represent control information as to each cycle of the particular instruction in its particular order or sequence. The encoder 16 connected to the output of the instruction cycle decoder 42 then determines from the information received at its input the particular steps of each cycle which must be performed. Thus, the encoder determines what steps are to be performed (such as enable the X register to the A input of the arithmetic and logic unit ALU, tell the arithmetic and logic unit ALU to transfer, and enable the C output to the Y register) and these instructions are generated by the encoder in the sequence determined by the control sequences 22 until control of the cycle sequencer control 20.

There is some work at the start of an instruction that is identical for all instructions. As an example, the instruction when read from memory must be transferred from the memory buffer register MBR into the instruction register ISR. This is accomplished by a preprocessing cycle which is performed prior to actual carrying-out of any instruction. Thus, the machine cycle sequencer 18 contains a section designated PRE which provides the sequence of steps to carry out the preprocessing cycle. The output of this PRE section of the machine cycle sequencer 18 is connected to a preprocessing cycle decoder 44 which determines the various cycles of the preprocessing instruction. The output from the preprocessing cycle decoder 44 is connected to the encoder 16 which then determines the individual steps of each cycle of the preprocessing instruction in the same manner as the other instructions derived through the instruction cycle decoder 42.

In the same manner, certain work is common at the end of every instruction; for example, the next instruction in the stored program must be read. This is accomplished by the Out instruction, and since this instruction is provided after completion of one of the general instructions, the machine cycle sequencer 18 provides a section designated OUT which is connected through an OUT cycle decoder 45 to the encoder 16 which then determines the individual steps of each cycle of the OUT instruction.

Thus, the machine cycle sequencer is provided in such a way that a preprocessing instruction is always carried out prior to a general instruction and an OUT instruction is always carried out at the conclusion of a general instruction. The machine cycle sequencer 18 therefore steps progressively through the preprocessing instruction, a general instruction and then the OUT instruction with each step being initiated through control from the cycle sequencer control 20.

Figure 2B:
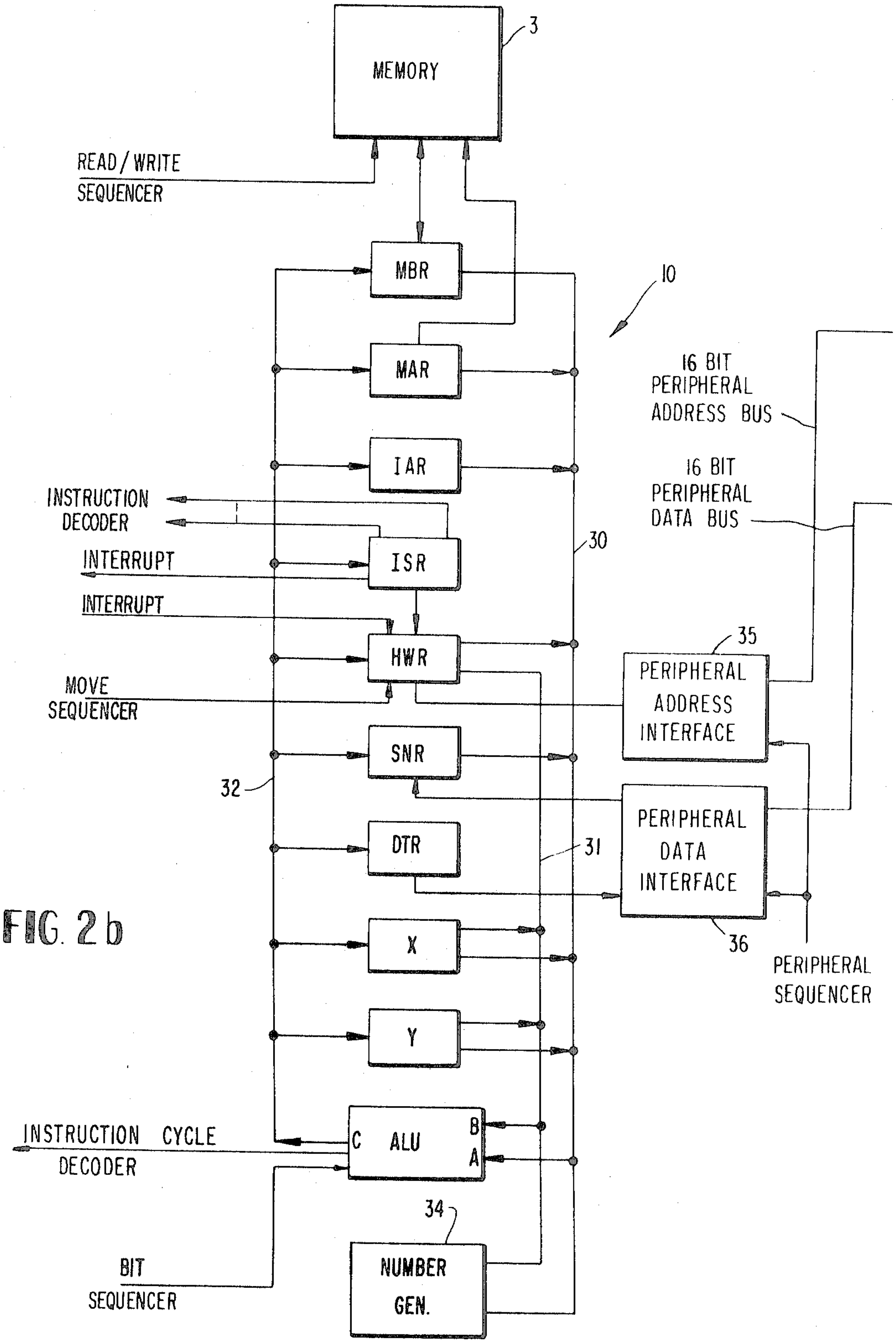

The output lead 50 from the encoder 16 represents a plurality of control leads which extend to various gates and control elements in the control registers illustrated in FIG. 2*b*. Thus, in accordance with the particular steps of each cycle of a given instruction, the various gates and registers may be enabled to perform the necessary functions required by the instruction. In addition, outputs from the encoder 16 are provided to the control sequencers 22 which include a clock distribute control 22*a*, a bit sequencer 22*b*, a read/write sequencer 22*c*, a peripheral sequencer 22*d* and a move sequencer 22*e*. Each of the control sequencers 22*a*–22*e* are enabled from the cycle sequencer control 20 so that each performs its required function as determined by the outputs from the encoder 16 in a particular sequence or order.

The control sequencers 22*a*–22*f* generally provide for an indexing or outpulsing of data from one register to another or to or from the memory under control of the clock 22*g* which is connected to each of these sequencers. For example, the clock distribute control 22*a* applies clock pulses to all of the registers and the number generator. The bit sequencer 22*b* is connected to the ALU circuit to tell the ALU circuit when to test a required bit and is connected to the clock distribute control 22*a* to control the serial operation of all the bit in the registers. The read/write sequencer 22*c* is connected to the memory and serves to effect a transfer of data or instructions thereto or therefrom.

The peripheral sequencer 22*d* applies the contents of the HWR register to the peripheral address bus during the entire period data is to be distributed to, or received from, the load 2, by applying a control signal to actuate the peripheral address interface 35. During the distribute period, the peripheral sequencer 22*d* applies a control signal to actuate the peripheral data interface 36 to continuously transmit the data stored in the DTR register to the peripheral data bus. During the middle of the distribute period, the peripheral sequencer 22*d* generates a distribute enable pulse on the distribute enable line that enables the peripheral devices to act on the address and data being transmitted. In the scan period (receiving information from the load), the peripheral sequencer 22*d* generates the scan enable pulse during the middle of the period so that the peripheral unit addressed gates data on the peripheral data bus. At the trailing edge of the scan enable pulse, the peripheral data interface 36 is enabled by the peripheral sequencer 22*d* to transmit the data from the peripheral data bus to the SNR register.

A move sequencer 22*e* generates a reset pulse and enables one clock pulse to the HWR register that causes the parallel entry of information into the HWR register.

The interrupt control 47 provides a means through which the processor program can be interrupted at the beginning of the next following instruction after presence of an interrupt signal has been detected. The processor is caused to execute a special program to service the interrupts. Upon completion of the interrupt program, the processor returned to complete the execution of the main program.

Figure 2C:
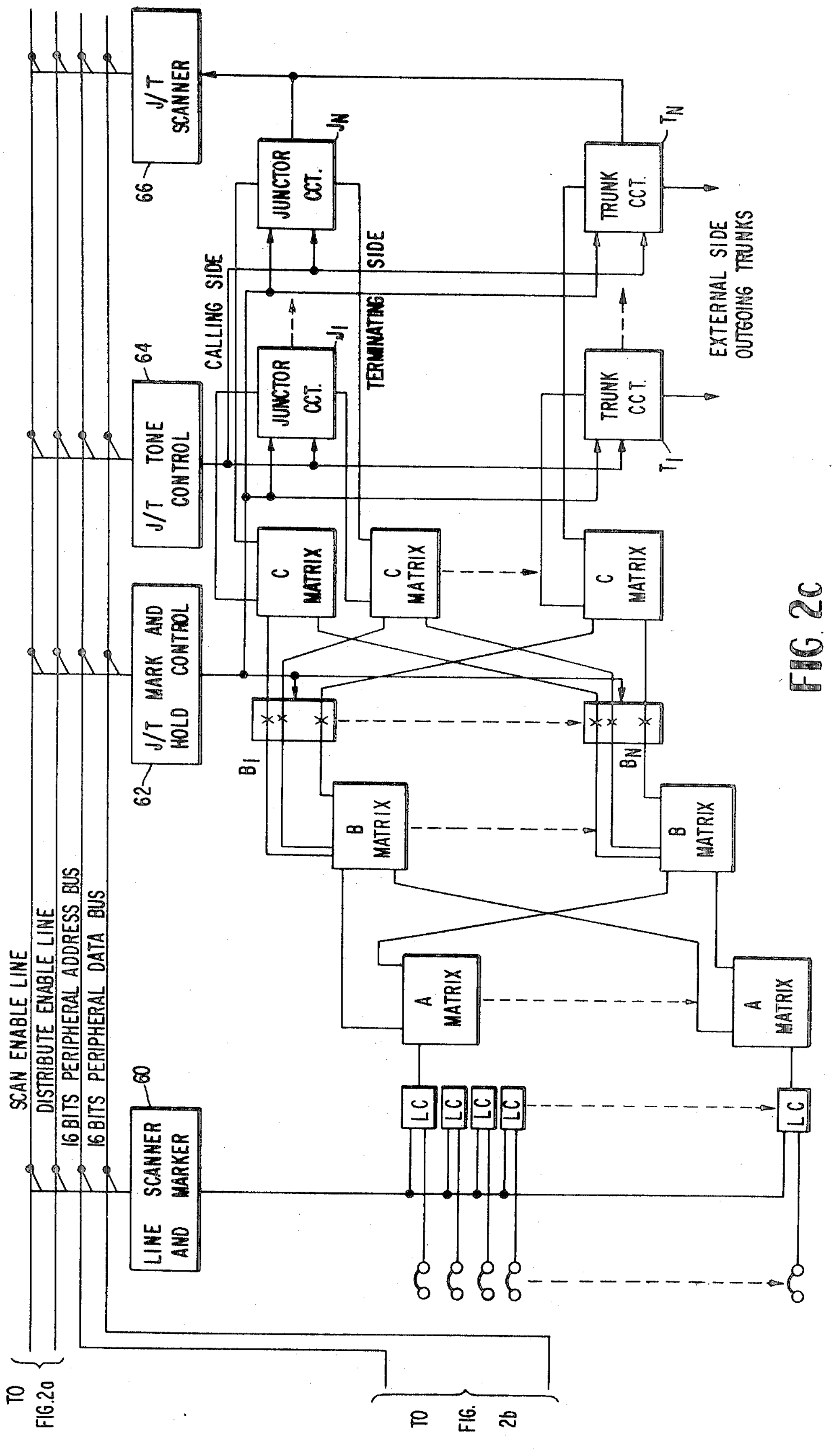

Turning now to FIG. 2*c* which schematically provides a telephone switching network in conjunction with the required interface system equipment necessary for applying control signals to the network and deriving supervisory data from the network. The interface system allows very flexible control of the telephone switching network through the use of a stored program control system, this flexibility being due to the absence of any logic or decision making equipment in the network or interface, as opposed to normal switching systems which employ "wire logic". The interface system has two functions, that it provides for a change in the configuration of the network as commanded by the processor and keeps the processor informed of subscriber initiated network conditions (open/closed loops, dialing, etc.). These tasks are performed by the line scanner and marker 60, a junctor/trunk mark and hold control 62, a junctor/trunk control 64 and a junctor/trunk scanner 66.

The A, B and C network stages are composed of conventional telephone relay matrices, and the general makeup of the network illustrated is provided only by way of example, other known configurations being equally applicable for control in accordance with the present invention. A connection from a subscriber line to a junctor $J_1$ through $J^n$ or trunk $T_1$ through $T_n$ is established by closing a B–C link, marking the line, and marking the junctor or trunk. Note that these three variables determine a unique path. A relay is energized at each matrix cross-point of the path which is marked, and holding relays in the junctors and trunks provide a holding current, so that the marked connection is maintained after removal of the mark signals.

The connection which links the interface system 12 with the processor consists of a 16-line peripheral address bus, a 16-line peripheral data bus, a scan enable line and a distribute enable line. These lines and buses are connected to the respective markers and scanners in the interface system equipment for purposes of applying control pulses and data to the switching network and deriving supervisory information from the network for application to the processor.

As instructed by the line/trunk scan portion of the program stored in the memory, the processor interrogates the line scanner and marker 60 (at time intervals dependent upon traffic) by scanning the address assigned to the scanner. The processor places this binary number onto the 16 address leads of the peripheral address bus, then pulses the scan lead with a logic number 1. Since each unit of the interface system is assigned a unique address, only the line scanner and marker 60 will respond to the scan pulse. If the scanner is stopped (has found an off-hook line), the line number on which it stopped is gated onto the data portion of the peripheral bus. This data is then applied to the scan register where it is stored for further processing or storage.

Having been apprised that a subscriber has requested service and having the address of the calling subscriber, the processor seeks a free junctor circuit for connection to the calling line circuit from data stored within the memory 3. All of the junctors and trunks are scanned periodically via the scanner 66 so that a constant record of the busy-free condition of each of these elements is recorded and stored in the memory. Thus, when it is necessary to obtain a junctor or trunk circuit an examination of the appropriate data area in the memory will indicate which junctor or trunk is available for service.

A free junctor is seized by the mark and hold control 62 in accordance with the data obtained as to the busy-free condition of the junctors from the memory. The processor will instruct circuit 62 also decides which of the B–C links $B_1$ through $B_n$ to close to provide a unique path between the subscriber and the selected junctor circuit. Once the path between the subscriber and junctor is complete, as determined by the condition of the supervisor relay in the junctor circuit, dial tone is applied from the tone control circuit 64 through the junctor back to the subscriber indicating that the system is prepared to accept dial pulse information. Constant scanning of the supervisory relay in the junctor circuits then provides the indication of dial impulses received in the junctor circuit, which impulses are analyzed by the processor to determine the destination of the requested call. If it is determined that an outgoing trunk circuit is required, the necessary switching of the subscriber line to an available trunk circuit is effected much in the same way as the junctor circuit is obtained, and this operation is carried out during an interdigit pause in the dialing.

The connection from a junctor circuit back through the switching network to a terminating subscriber line circuit occurs much in the same way with the address of the subscriber being applied to the line scanner and marker 60 so that the line circuit is marked. The mark and hold control 62 then provides for connection of a path from the terminating line circuit through to the junctor circuit thereby establishing a connection between the calling subscriber and the terminating subscriber through the switching network.

Line scan, control and interconnection in accordance with the present invention will now be described in grater detail. However, the multiplicity of time intervals involved in loop analysis will not be specifically set forth herein since this information is well documented in telephone literature. The control over the telephone exchange by the stored program system can be basically broken down into three main operations, i.e., line/trunk scan, loop analysis, and network connection.

Figure 3:
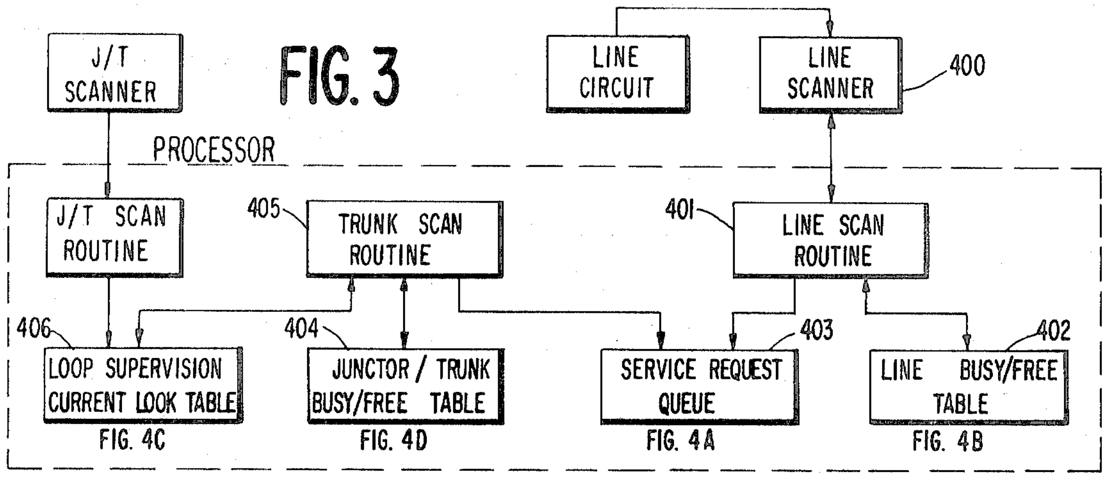

The line/trunk scan process consists of two input scanning routines, one for trunks and the other for lines, and one common queue accessing routine, as shown schematically in FIG. 3. The process is so arranged that the trunk scan routine 405 is executed first thus giving trunks a higher priority in acquiring service. Trunk scanning involves the use of various memory storage areas, such as the loop supervision current look table 406, the junctor/trunk busy/free table 404 and the service request queue 403. The busy/free table 404 contains the status of each junctor and trunk, the current look table 406 contains the current loop condition of the junctors and trunks, and the service request queue provides the identity of lines and trunks requesting service in the order the requests are received.

Line scanning involves the line scanner associated with the line circuits controlled by a line scan routine 401 which utilizes the data areas in the memory, including the service request queue 403 and a line busy/free table 402. As indicated previously in connection with the peripheral equipment, the line scanner 400 is a nonhoming line scanner which continuously scans all lines looking for a request for service. On detection of a request the scanner stops and sets a flag indicating a request is present. The line scan routine 401 interrogates the line scanner to see if a flag is set. If the flag is set, the line identity contained in the line scanner is transferred to the processor via the peripheral bus. The line number is checked for validity and if valid its busy/free status is stored in the table 406. The line number is also entered in the service request queue 403 for further processing. If invalid, the line number is rejected.

Figure 4A:
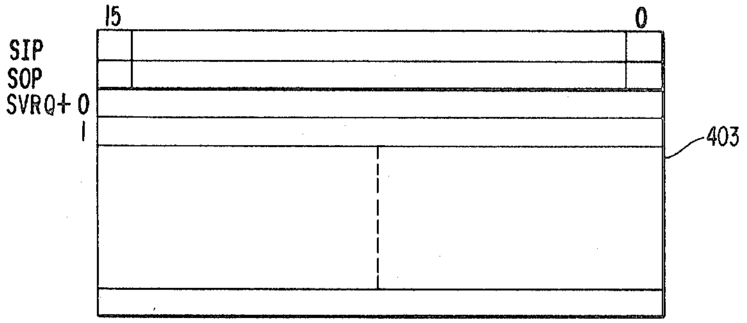

FIG. 4*a* shows the data format of the service request queue 403 including its pointers SIP (service request queue inpointers) and SOP (service request queue outpointer). Each entry shown in the memory layout is a 16-bit work with SIP pointing to the next entry location. The leftmost bit (bit 15) in sip is a flag bit which if set to 1 indicates the queue is full. The pointer SOP points to the next exit location, the leftmost bit (bit 15) thereof serving as a flag bit which if set to 1 indicates that the queue is empty.

Figure 4B:
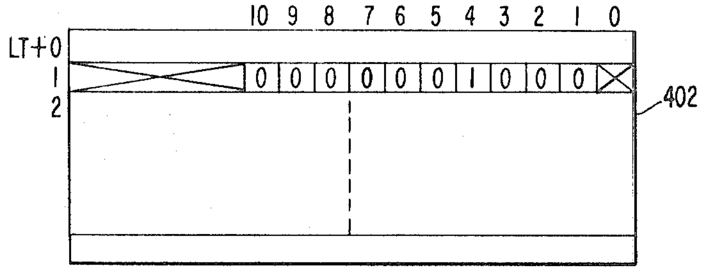

FIG. 4*b* shows the data format of the line busy/free table 402. The busy/free status of lines are stored on a bit basis, that is a 1 indicates a busy status and a 0 indicates a free status. Each entry in the table corresponds to a line group of a first stage switching matrix. Each bit within an entry corresponds to a specific line within the line group. Thus, the table as illustrated in FIG. 4*b* is set up to accommodate a switching arrangement wherein each matrix provides for connection to 10 lines. It is also noted from the FIG. that the LT+1 entry reflecting the status of every line assigned to the first switching stage indicates that line 014 is busy.

Figure 4C:
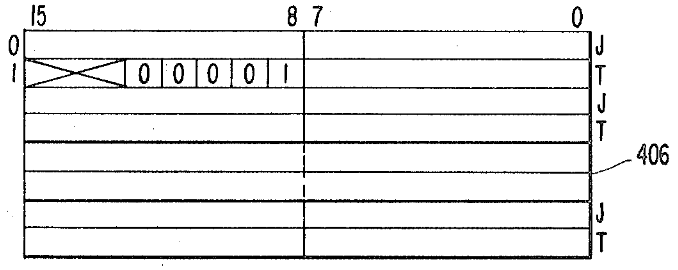

FIG. 4*c* shows the data format of the loop supervision current look table 406. Status information is also provided on a bit basis in connection with this table with a "1" indicating off hook and a "0" indicating on hook. A typical entry shown in FIG. 4*c* indicates one trunk is off hook, i.e., the first trunk in the first trunk group. The current look is arranged such that even and odd number entries are assigned to junctors and trunks, respectively.

Figure 4D:
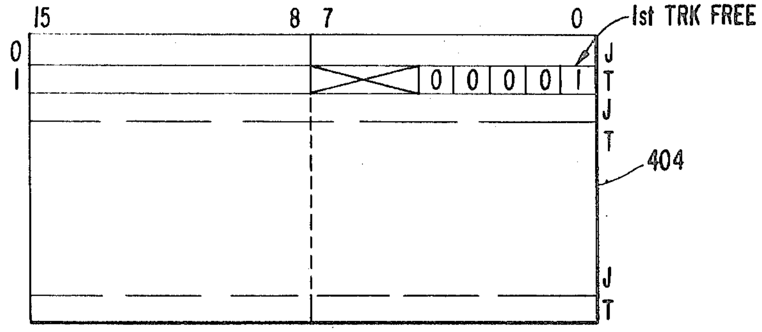

FIG. 4*d* shows the data format for the junctor/trunk, busy/free table 404. The same format is used in this table as in the current look table 406 with the exception that the information is contained in the right half of the entry.

Figure 5:
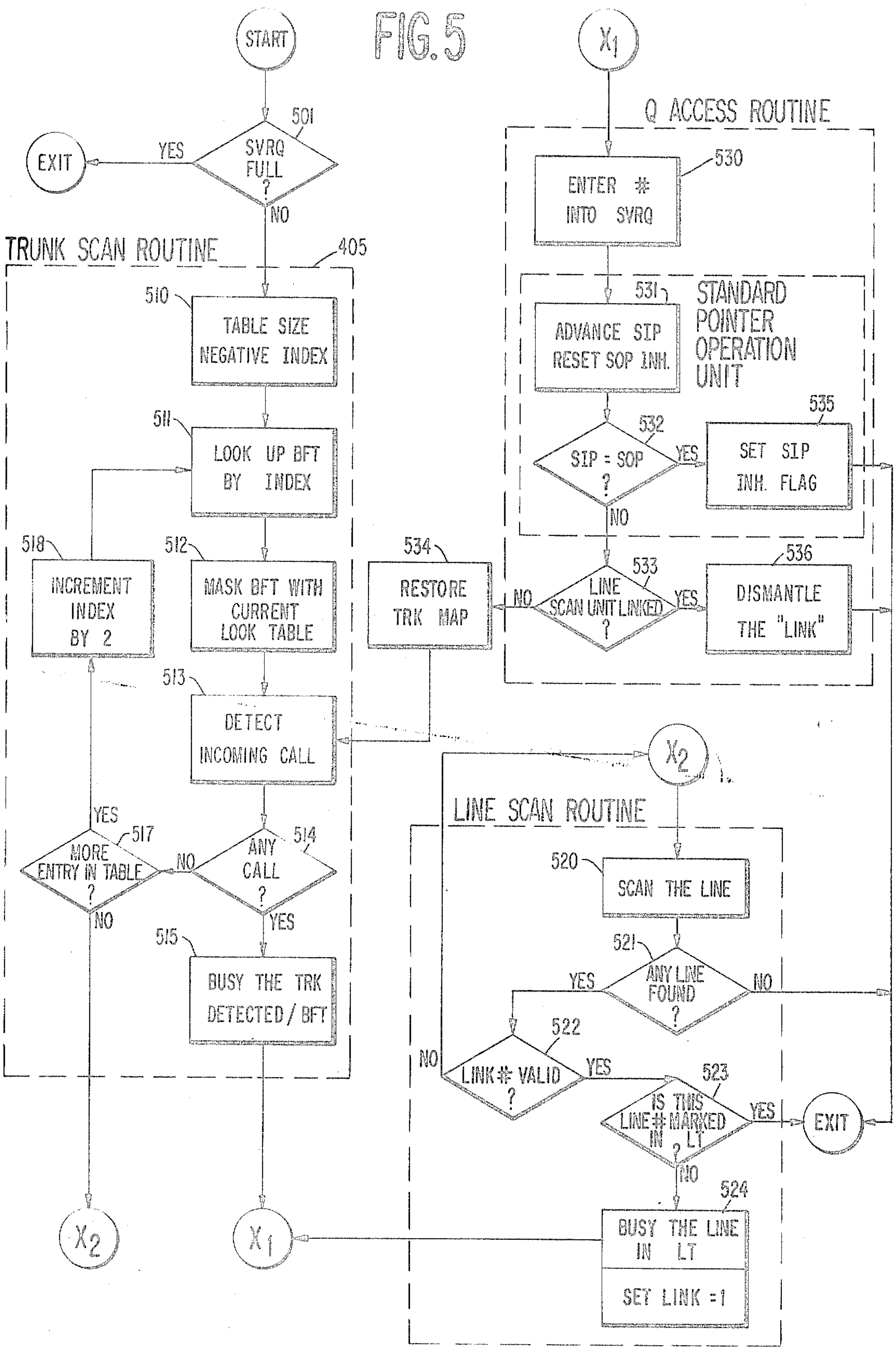
FIG. 5 is a flow chart of the line/trunk scan process performed by the system in accordance with the present invention.

The line/trunk scan portion of the process will be described in detail in connection with the flow diagram of FIG. 5. This flow diagram is subdivided into three routines, the trunk and line scan routines and the queue access routine. The first routine to be executed in the process is the trunk scan routine. At the start of the process a check is made to determine if the service request queue SVRQ is full (step 501). The primary object of this portion of the operation is to enter requests for service into the service request queue. If the queue is full, the routine exists at step 501. In the event the service request queue is not full, the trunk scan routine is initiated. Step 510 provides the table size and negative index to permit the busy/free table 404 and current look table 406 to be interrogated. The first trunk entry from the busy/free table and the current look table are obtained at steps 511 and 512. A check is now made to determine if a free trunk is requesting service. The busy/free status of trunks is indicated in the busy/free table. A trunk request for service will be so indicated in the current look table as an off hook condition or "1" in the bit position assigned to the trunk (for example as previously described in connection with FIG. 4*c*).

If a trunk request is noted at steps 513 and 514, i.e., a free trunk with a current look status of "off hook" is found, the busy/free table 404 is updated to reflect the new busy status of the trunk at step 515. The process now enters the queue access routines via X1. Note, if no trunk request is detected, the program loops through steps 517, 518, 511, 512, 513 and 514 until all entries in the tables have been interrogated. When all of the entries have been interrogated, the trunk scan routine exits to the line scan routine via X2 at step 517.

The primary purpose of the queue access routine is to enter the line or trunk numbers requesting service into the service request queue, which is accomplished at step 530. After the number is entered, the standard in and out pointer housekeeping is performed. The inpointer SIP is incremented and the queue empty flag (bit 15 in SOP) is reset at step 531. A step 532 a comparison is made between SIP and SOP to determine if the queue is full. If SIP and SOP are equal, the queue is full and the queue full flag (bit 15 in SIP) is set at step 535 and the process then exits. If the comparison between SIP and SOP indicates that the queue is not full, then a check is made to determine if the line scan unit is linked at step 533. If the line scan unit is not linked, i.e., if the trunk scan is still in progress, the queue access routine transfers to the trunk scan routine at step 534. A check is then made to determine if any other trunks within the existing entry are requesting service. The trunk scan routine now functions as previously described. If the line scan unit is linked at step 533, then the link is dismantled at step 536 and the program exits. When all trunk entries have been checked, the routine exits via X2 to the line scan routine.

The primary function of the line scan is to determine if any lines are requesting service, and if so to enter the line number in the service request queue. Entry to the line scan routine is via X2. The first function of the line scan routine is to interrogate the line scanner to determine if a line is requesting service, which is performed at steps 520 and 521. If a line is requesting service, a check is made to determine if the line number is valid at step 522. If the line number is not valid, the line scanner is again interrogated via X2 and step 520. If the line number is valid, a check is made to determine the busy or free status of the line at step 523, and if interrogation of the line busy/free table indicates that the line is busy, the program exits. If the line is free, then the line busy/free table is updated to indicate the new busy status thereof at step 524, and at the same time the link bit is set to 1 at step 524. The line scan routine now transfers control to the queue access routine at X1.

The line number is entered into the service request queue at step 530, and the inpointer and outpointer housekeeping is performed as previously described. The queue access routine finally checks to determine if the line scan unit is linked at step 533. Since the link was set to equal 1 in step 524, the line scan unit is linked. The link is now dismantled at step 536 and the process exits.

Once the lines or trunks which request service are detected through the line/trunk scan routine and control is initiated by the central processor to interconnect the lines through the switching network to available junctors so that dial tone can be returned to the subscriber, the system is ready to monitor the line conditions so as to provide dial impulse detection. The loop analysis to be described in connection with the present invention has the capability of functioning with loop pulsing speeds in the range of 8 pulses per second to 12 pulses per second. A nominal loop impulse is defined as 100 milliseconds during which the loop is opened for 60 milliseconds and closed for 40 milliseconds.

Figure 6:
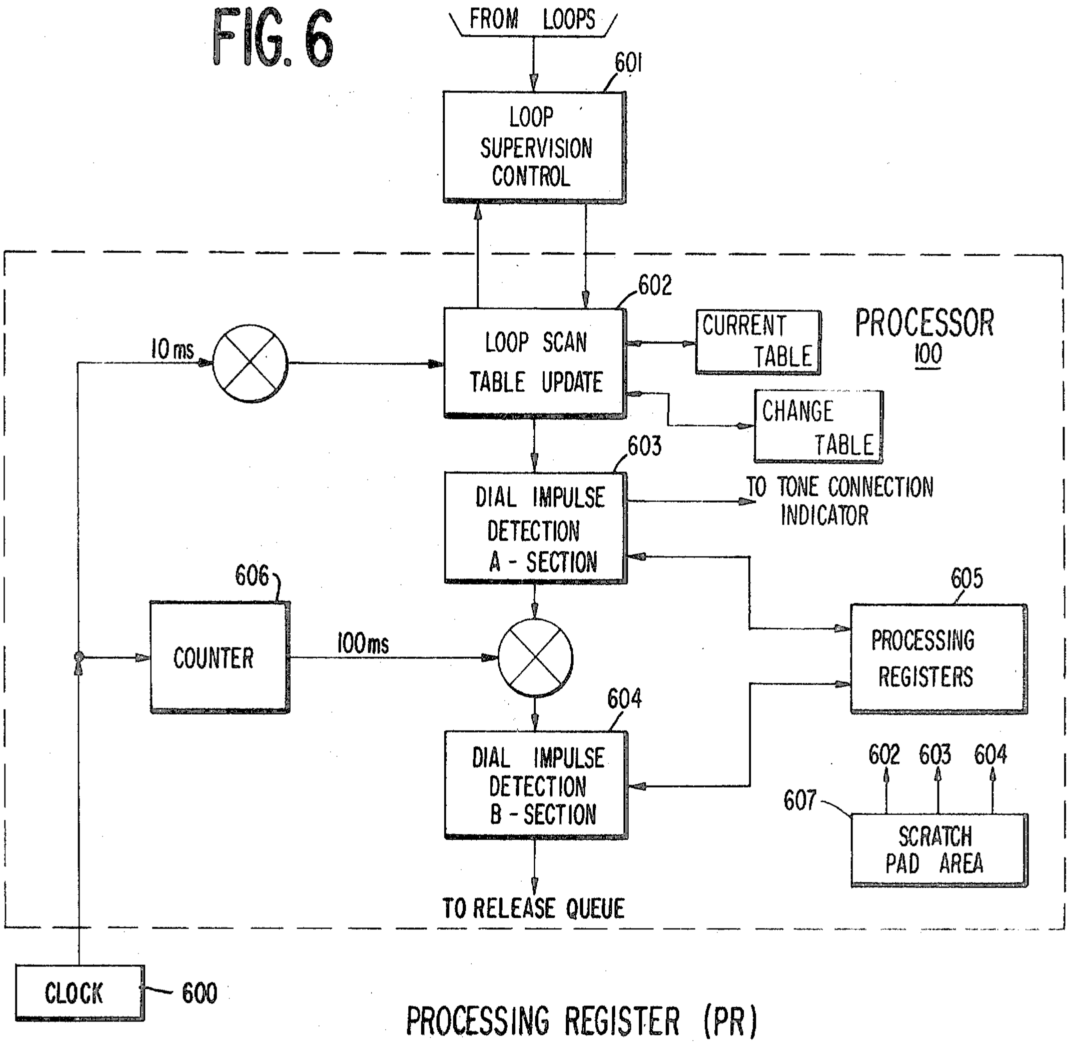
FIG. 6 is a schematic diagram illustrating the functional association of systems and data areas for effecting control over a telephone system.

FIG. 6 provides a general schematic diagram of the various units that are required to perform the analysis for a multiplicity of loops using a stored program system. Since loop analysis deals with the measurement of time intervals, a time base is provided by a clock 600 so that a 10 millisecond time period and a 100 millisecond time period via counter 1 106 are available. Every 10 milliseconds the functions provided by the loop scan/table update routine and the dial impulse detection A-section routine are executed in the sequence shown. Every 100 milliseconds the functions provided by routines 602, 603 and the dial impulse detection B-section 604 are executed in the sequence shown.

The loop supervision control 601 is an interface unit such as the junctor/trunk scanner 66 (FIG. 2*c*) that receives information from some form of detection device located in the loop (usually a supervision relay) on command of the processor during the loop scan/table update routine 602. The information received by the loop supervision control 601 is converted to the digital form required by the processor and passed into the processor. The routine 602 also provides the necessary logic decisions that create a current look and a change look table for future use during dial impulse detection.

The dial impulse detection A-section 603 provides the logical sequences necessary to determine if the changes which occur in a loop are or are not a dial impulse. Impulses detected are accumulated in a dedicated area of the memory forming a plurality of processing registers 605 the format of which is set forth in FIG. 7*a*. Impulses of too short a duration are rejected while the dial impulse detection B-section caters to time intervals that are longer than an impulse, such as the interdigital time period and the release time period. The dial impulse detection B-section also performs the task of arranging the accumulated data contained in the processing registers into the final format required for future processing. A special data area of the memory serves as a scratch pad area or store 607, which is utilized during various portions of the process to retain temporary data that occurred during the course of process execution.

The format employed for storing loop information in the current and change look tables in show in FIGS. 7*b*. Each loop that is to be analyzed in the system is assigned a dedicated bit position in the current look table. The bit position assigned to a given loop in this table will be the same bit position assigned to the loop in the change look table. Likewise, loops assigned to the first entry in the current look will also appear as the first entry in the change look table. A basic requirement for the dial impulse detection A-section portion of the process is to provide storage that can retain control and data information until a decision can be reached that the area in question is no longer needed. To accomplish this need a processing register is employed along with a dial pulse indicator DPIND having a format as indicated in FIG. 7*b*. The indicator serves the purpose of determining which processing registers are engaged in loop analysis.

A processing register is made available for loop analysis by marking the dial pulse indicator DPIND and storing in the junctor work JTR (FIG. 7*a*) the identity of the loop (J/T) to be analyzed. Since the loop analysis being discussed deals with a telephone system, the loop identities in question will be junctors or trunks. The dial pulse indicator DPIND is arranged such that each bit position within the indicator corresponds to a given processing register.

The various process loops that make up the loop supervision analysis process are shown in the flow diagram formed by FIGS. 8*a*, 8*b* and 8*c*. Data areas (processing register, loop supervision tables) necessary to understand the functions of the loop supervision analysis process are shown in FIGS. 7*a* and 7*b*.

As described previously, the execution of the loop supervision program starts each time a 10 millisecond time mark occurs from the clock 600. The total time required to execute the loop supervision program therefore must not exceed 10 milliseconds. This restriction can be met by limiting the number of loops supervised to the maximum number that can be safely handled in a 10 millisecond time period.

A loop analysis program begins at the start point shown in FIG. 8*a*. Steps 810 through 815 make up a loop that performs the following sequential tasks. The table size or number of entries in the current look table, for example 16, expressed as a negative number, is loaded into a work register. The table size will be used as an index number and is added to the base memory address for the position in the memory occupied by the current look table to obtain the first entry in the table. The first entry is saved in the store or scratch pad 607 and the loop status points associated with the first entry are scanned during step 811. The current status of the points scanned is stored in the first entry of the current look table at step 812. The current status is now compared with the entry saved during the prior scan interval and the results are stored in the change look table at step 813. The index number is incremented and tested to determine if the index number is still negative at steps 814 and 815. If the index number is still negative, the new index number is added to the current look table base address and the program continues as before, except that the second entry is obtained from the current look table. The process continues until the index number is no longer negative (it is 0) at which time the dial impulse detection A-section of the process is initiated.

The execution of the DIDA routine indicated by the flow diagram of FIG. 8*b* begins at step 820 where the dial pulse indicator DPIND is loaded into a work register. The indicator is inspected at step 822 to determine if any processing register requires dial impulse detection. If there is no request, the time is checked at step 852 to determine if sufficient time has elapsed to execute the DIDB portion of the process. If the time indicates that 100 milliseconds has not elapsed since the last time the DIDB process was executed, the loop analysis process ends until a new 10 millisecond time mark is generated by the clock.

If the dial pulse indicator DPIND contained processing registers that required loop analysis, the first rightmost bit in the DPIND is selected. The processing register associated with the bit position selected will not be operated upon by the DIDA portion of the process. The loop that is assigned to the processing register is contained in the JTR word of the register (see FIG. 7*a*) in the form of the junctor/trunk number. The number contained in the JTR portion of the register performs a threefold job. Its first function is to define the physical location of the loop being analyzed. Its second function is to provide an index number to access the change table, which is provided by the foremost significant bits of the number. Its third function is to locate the bit position within the change table that corresponds to the loop being analyzed, which is accomplished by the four least significant bits of the number. Step 823 of the process serves to breakdown the junctor/trunk number into its component parts such that the proper change bit in the change table corresponding to the loop in question can be interrogated at step 824.

If the change bit in question is a "1," the loop that consists of steps 830, 831 and 832 is entered. The ACR work of the processing register, which was made "0" when the register was assigned, is updated by setting the CHT and RLL bits to "1" and the RIT to "0." The CHT bit is the loop change bit, the RLL bit is the register last-look-of-the-loop-since-a-change-occurred bit and the RIT bit is the register interdigital time bit. Once the ACR word has been updated, the program returns to step 822 via $X_1$ to look for the next rightmost one in the dial pulse indicator DPIND. For any change that occurs in the loop being analyzed, the change loop which consists of steps 830, 831 and 832 will be executed.

If the change bit interrogated at step 824 is not a "1," the loop consisting of steps 840 and 841 is executed. The ACR word of the processing register is inspected to see if the change bit CHT is a "1." If the change bit is not a "1," a jump is made to step 832 via $X_2$ which in turn returns the program to step 822. The next processing register. if any, is now handled. The loop consisting of steps 840 and 841 is the most often used loop in the process since the majority of the time a loop is in a no-change state.

If the change bit CHT tested at step 841 is a "1," step 842 is undertaken which resets the CHT bit to "0," and the RLL is then tested at step 843 to determine the state of the loop since the last change occurrred. If the RLL bit is not "0," pulse bit P is tested at step 850 to determine if it also is "0." If the P bit is "0" the conditions existing on the loop are interpreted as an impulse that is too short a duration and is rejected. The basic function, therefore, of the tests performed by steps 843 and 850 is to screen out all loop changes that do not achieve a steady state in one 10 millisecond period.

If the RLL bit is "0" at step 843, the P bit is set to "1" at step 845 and the dial tone DT bit in the ACR portion of the register is checked for "0" at step 846. If the DT bit is "0," indicating that no dial tone is being applied, a jump is made via $X_2$ to step 832 which returns the process to step 822. A new processing register, if any, can now be handled. The conditions described form the impulse loop in that the condition existing on the loop is an impulse that has achieved a stable state for 10 milliseconds. If the DT bit test at step 846 is not "0," the work indicator for the tone condition routine (step 847) is marked to indicate that a job exists for the routine to execute. The specific job that will be executed is to remove dial tone from the loop. Step 847 is entered only once during the course of analyzing a loop.

Once the P bit has been set to "1," the DIDA routine will idle in the loop consisting of steps 840 and 841. It is obvious that the logical sequence which leads up to the idle loop also must be performed. The routine will always enter the idle loop or any loop that is in a stable state each time it is executed. Since the P bit has been marked, a change in a loop must occur within 100 milliseconds if the action being described by the loop is to be an impulse. When the change occurs, the change loop is entered at steps 830, 831 and 832 and performs the functions described earlier. The major logical sequence for this loop is set at step 831. During the next 10 millisecond time period, the loop consisting of steps 840, 841, 843, 850 and 851 will come into play. Once again, no decision can be reached unless the loop has achieved a stable state for a minimum of 10 milliseconds.

Since the P bit is a "1," a step 851 will be entered which sets the P bit to "0" and adds 1 to the accumulator ACC in the ACR portion of the processing register. Once this task has been performed, a jump is made via $X_2$ to step 832 which in turn returns the routine to step 822. All of the various sequences described are repeated, (except for step 847) until all of the necessary dialed information has been received by the processing register or the call is abandoned.

The execution of the DIDB portion of the process beings at point B in FIG. 8*c* and is executed every 100 milliseconds. Step 860 performs the same function that step 822 accomplished in connection with the DIDA portion of the process. If there is a processing register or registers engaged in loop analysis, the ACR work is loaded into a work register at step 861 and the RIT bit is inspected to determine if it is a "0" at step 862. If RIT is a "0," the bit is set to "1" at step 863 and the dial pulse indicator DPIND is interrogated to determine if any other processing register must be serviced. The setting of the RIT bit to "1" signals the start of a 100 millisecond time interval. If no changes occur in the loop assigned to a processing register, in which the RIT bit is "1," the RIT bit will remain 1. If a change occurs, the DIDA routine will set the RIT back to "0" and a new 100 millisecond time interval must be started by DIDB.

If the RIT bit is not "0" at step 862, the RLL bit is interrogated to determine if it is "0." If the RLL bit is "0," the condition which exists on the loop is such that the loop has been opened for 100 milliseconds or longer. Since the loop in question has been opened for this time period, the condition is judged a release. The information required to release the equipment that was being used (links, junctor, trunk) is entered into a release queue at steps 872 through 876. The operation of the queue will not be discussed since it is not of major importance to the DIDB function.

Once the release queue operation is complete, all work indicators that may have been affected by loop analysis are reset at steps 877 and 899. The digit analysis indicator DAIND, busy/free indicator BFIND and the dial pulse indicator DPIND are the indicators that are under control of the DIDB routine. The indicators DAIND and BFIND employ the same format as DPIND. The resetting of the DPIND indicates that no further loop analysis is required and hence the DIDA and DIDB routines will not longer be executed for the processing register involved. In a like manner, the BFIND frees the processing register so that it can now be assigned to another loop. The DAIND is reset so that time is not wasted in performing an analysis on the first dialed digit.

If the RLL bit is not "0" at step 870, then the condition that exists on the loop has been closed for 100 milliseconds or longer. If the loop in question has been closed for this time period, the condition is judged an interdigital period provided the accumulator in the processing register is not "0" at step 880. If the accumulator is "0," then the loop is only in a prolonged off hook period and the routine will loop back to look for another processing register. If the accumulator is not "0," the IDC bit is tested for "0" at step 881. If the test is "0," the data contained in the accumulator is the first dialed digit and it is moved to the first digit store in the ACR portion of the processing register at step 882. A "1" is placed in DAIND corresponding to the processing register being serviced at step 883. The ACC is set to "0" and IDC is incremented in the ACR at step 894. The routine loops then back to look for another processing register.

All the sequences described are repeated every 100 milliseconds except when step 881 is reached. Since the IDC has been incremented, the routine will now enter step 890. If the IDC is equal to 1, steps 892 and 893 are executed. Since information received from a telephone dial is not in true binary form, the data contained in ACC is converted to its binary equivalent and stored in the DGR word of the processing register. Step 899 is then undertaken and the sequence described above for this step is carried out.

The routine will now follow the path form step 881 to 890 to 895 where the next dialed digit is handled. The third dialed digit is added to the contents of DGR at step 896 (DGR contains the binary equivalent of the second dialed digit) and step 899 is undertaken to complete the loop.

The last loop in the DIDB routine can now be undertaken when step 895 is tested to determine if it is equal to 2. Since the IDC is now equal to 3, step 897 is undertaken. The fourth dialed digit is concatenated to the data contained in DGR to complete the terminating line number. The network connection indicator is marked NCIND in the bit position corresponding to the register being serviced at step 898. The marking of the NCIND turns control of the processing register over to the network connection terminating routine. The functions performed by this routine will be described below. Step 899 is undertaken and the DPIND is reset indicating that no further loop analysis is required by the DIDA and DIDB routines. The routine now looks for another processing register service.

The translation performed in DIDB is not an essential part of the DIDB routine and is included only from the standpoint of its influence on the overall configuration of a stored program system. The translation described is only one of many that could be used and in some instances no translation at all may be required. The DIDB routine possesses the flexibility to cater to no one or any translation scheme.

A fundamental requirement for any communication system is the switching of a known inlet to a free outlet. The network connection routine described herein is based on a three-stage switching network wherein the number of inlets exceeds the number of outlets by a factor of approximately 5 to 1. Such a system is described and illustrated, for example, in connection with FIG. 2*c*.

The mark and hold control 62 of FIG. 2*c* receives coded information from the network connection routines via the peripheral bus. The information received by the mark and hold control 62 contains the inlet required in a given first stage, the outlet required at a given final stage and the BC link switch required to close a path between these two points. The function of the mark and hold control, as already described, is one of applying the proper electrical signals to the points indicated.

The network connection routine in accordance with the present invention is divided into two parts. The calling routine is primarily concerned with finding a path in the switching network between a free outlet and an inlet requesting service. The terminating routine is primarily concerned with finding a path between a known outlet and a known inlet. The memory contains a mask table providing the busy-free status of every AB and BC link in the switching network while the busy-free state of each outlet is contained in the junctor/trunk table, also provided in the memory. The equipment in use table, as indicated previously, contains the record of which equipment is in use including the AB or BC link which may be presently in use. The indicators employed by the network connection routine provide the location of the processing registers which contain information required in establishing a path through the switching network. The memory also provides a service queue form which may be obtained inlet line numbers that require service. The busy-free state of all lines in this system is interrogated by the network connection terminating routine to determine if a line is busy or free before a path is set up. The memory also provides a release queue employed by the network connection terminating routine to release a path that will not be required in a final connection. In addition, as indicated previously, a store or common scratch area is also provided which may be used by the routine to contain temporary data that may occur during the execution of the process.

FIGS. 9*a* and 9*b* are flow diagrams for the network connection calling routine. The execution of this routine begins at the point labeled start A in FIG. 9*a*. Steps 900 to 904 perform in this routine. This is an important consideration in a real time system since time not used in one routine can be gainfully employed by some other routine. To achieve this goal, the service request queue outpointer is accessed at step 900 and is checked at step 901 to determine if any entry is available in the service request queue. If there is no entry in the queue, the routine will exit since there is no originating traffic being generated. If an entry is obtained from the queue it is saved in the scratch pad area of the memory at step 902 and the register busy-free indicator BFIND is interrogated to determine if a free processing register is available at step 903. If the processing register is available, it is assigned to the entry obtained from the queue and the new status of the BFIND is saved for updating at a later time in the routine.

The processing register selected is initially set to "0" at step 904 and the entry obtained from the queue is tested to determine if the entry is a line or trunk number at step 905. A line number is characterized by having a zero mark in bit position 15 of the queue entry word while a trunk number has a one marked in the bit position. If the entry obtained from the queue is a trunk number, a trunk label is stripped off and the trunk number stored in the junctors/trunk register JTR word of the processing register involved at step 910, the BFIND is updated and the bit position assigned to the processing register involved is set to a "1" in the dial pulse indicator DPIND at step 915.

The in and out pointers associated with the service queue are adjusted to reflect the new status of the queue at step 916. While the detailed operation required to update the pointers is considered a housekeeping task, the end result of the task is interrogated at step 917. If the queue is not empty, which implies another entry resides in the queue, the routine will loop back to start A and will now attempt to handle the next entry in the service queue. If the queue is empty, the appropriate inhibit flag is set in the outpointer at step 918 and the execution of the routine ends.

If the entry obtained from the queue is judged to be a line number at stp 905, a scan order is issued to the timer in the mark and hold control 62 at step 919. If the mark and hold control is busy, the routine will exit at step 920, the basic reason for checking the status of this control element is to insure that the control can execute only one command every 30 milliseconds. In contrast the network connection routines can generate, on the average, new commands for the mark and hold control 62 every 1 millisecond. To insure an orderly execution of commands by this control unit, the control timer must be checked. If the hold control is busy, it is needless to proceed any further since the generation of a new command by the routine will not be carried out.

If the mark and hold control is free, the AB mask that pertains to the line number in question is obtained from the mask table in the memory and saved in the scratch area at step 921. The location of the proper AB mask within the mask table is a function of the line number. The six most significant bits of the line number are placed in a work register and the least significant bit of the number is forced to "0". The resulting number is the index number or the location of the entry in the AB mask table that contains the desired mask. Since each entry in the AB mask table contains two masks for two separate first stages, bit position 4 of the line number is interrogated to determine if it is odd or even (0 or 1). If the bit in question is a "0", the AB mask required occupies the right half of the entry while a "1" means the mask required occupies the left half of the entry.

A search is now made of the busy-free junctor/trunk table BFT to determine if a free junctor exists in the system. The search loop is comprised of steps 922 through 924. The table size or number of entries in the BFT, expressed as a negative number, is loaded into a work register. The table size serves as an index number and is added to the base address of the BFT to obtain the firs entry and all subsequent entries therein at step 922. As each entry is obtained from the BFT, it is inspected to determine if a free junctor exists in the entry at step 923. If a free junctor cannot be found, the current index number is advanced by two at step 924 and a test is made to determine if it is negative at step 925. If the index number is negative, the sequence described is repeated until a free junctor is found at step 923 or the index number is no longer negative as determined at step 925. The adding of two to the current index results from the arrangement of junctors and trunks in the BFT. Junctors occupy all even numbered entries while trunks occupy odd numbered entries.

If all junctors are busy, the routine will exit since no new connections can be established until one or more junctors become free. If a free junctor is found, the routine continues to the link matching loop labeled by the steps 930 through 933 in FIG. 9*b*. The number of the free junctors found is saved in the scratch area of the memory at step 930 and the BC mask associated with the junctor is obtained from the mask table at step 931. The foremost significant bits of the junctor number (junctor numbers are 8 bits) are used as an index number to access the proper entry in the BC mask table. Since this portion of the routine deals only with calling or originating connections, the BC mask desired will always occupy the right half of the BC mask table entry. A match is now performed between the AB mask obtained at step 932 and the BC mask at step 931. The match performed at step 932 is to determine which bit positions in the AB and BC masks both have a "1" (free state) in the same bit positions. Step 933 performs the function of detecting the first such match.

If a match cannot be found, there is no free link between the calling line and the junctor selected. The current index number will be advanced by two at step 935 and if the index number is still negative at step 936, the search for another free junctor will be initiated by the junctor search loop at steps 922 through 925 (FIG. 9*a*). If the index number is not negative when tested at step 936, a blocking condition exists within the switching network. The term blocking as used in a switching network describes the condition where free junctors or trunks are available, but no free path (AB or BC link) exists that can connect a free junctor or trunk to the line in question.

If a match is found and a free link is available, the update loop formed by the steps 940 through 945 is executed. Step 940 updates the AB and BC masks to reflect that the bit position where the first match was detected is now busy (set bit position to 0). Step 941 updates the BFT to reflect that the free junctor chosen is now busy while step 942 packs the line number involved in the connection and the free link found (B matrix) into the equipment in use table EIV. The junctor number involved in the connection is used as an index number to locate the proper entry in the equipment in use table in which the line number and link number are stored. Step 943 collects the data necessary to set up a path through the switching network and distribute the data to the mark and hold control 62. The data required to set up a connection is the line number, junctor number and link switch number. Step 944 stores the junctor number being used and the tone code for dial tone in the junctor word of the processing register found at step 903 and also marks the dial tone DT bit in the ACR word. The tone connection indicator TOINT is marked in the bit position corresponding to the processing register being used at step 945 so that dial tone will be applied to the connection. The remainder of the loop is now executed at steps 915 through 918 wherein the functions described earlier are performed in connection with these steps.

FIGS. 10*a* and 10*b*, when combined, provide a flow diagram of the terminating portion of the network routine. The execution of the routine starts at point TX. The number of processing registers containing information that must be processed by the routine is contained in the network connection indicator NCIND. Any processing register requiring the use of the process is detected at step 950. If there are no registers requiring the use of the process, the routine will exit. If a processing register is found that requires the use of the routine, the DGR work contained in the register is obtained at step 951. The contents of DGR is checked to determine if a line number or a trunk number is contained in DGR at step 952.

If a line number resides in DGR, the line-to-line loop of the routine will be executed. The line-to-line loop consists of steps designated 955 through 958 and 975 through 977. The line number contained in DGR is checked at steps 955 and 956 to determine if it is a valid number. A valid line number is defined as any number within the bounds of the system. If the line number is not a valid number, step 971 is entered and the tone code for fast busy tone is stored in the JTR word of the processing register. The NCIND is updated at step 973 which removes the processing register in question from the indicator and loops back to step 950 to look for more work.

If the line number is a valid number, the busy-free line table is checked to determine if the line number is free or busy. If the line number is busy, the tone code for busy tone is stored in the JTR word of the processing register at step 971. Step 973 is then entered and the sequence described for this step is repeated. If the line number is free, the line to trunk mark LTM control word is set to "0" at step 953. The LTM control word will be used later in the routine to determine what tables, tone code and indicators should be updated. The line number in DGR is checked at stp 975 to determine if the line number has a listed class of service. If the line number in question is not listed, a call will not be permitted at stp 976 and the sequence described for step 973 applies. If the call is permitted, the junctor number contained in JTR is modified at stp 977 to reflect the terminating or called side of junctor.

The BC mask associated with the modified junctor number is obtained at step 980 along with the AB mask associated with the line number obtained at step 981 (Fig. 10*b*) and a match is obtained between the two masks at step 982. If a match cannot be found (indicating no available link) at step 983, the sequence described for step 973 is executed. The matching sequence employed by the routine is the same as the sequence used in the calling portion of the routine. If a link is available, the mark and hold control 62 is checked to determine if it is busy or free. If the control is busy, the routine will exit and the set up of the call involved will be delayed until the control is free. If the control is free, the AB and BC masks are updated at step 990 (FIG. 10*c*) in the same manner as performed in connection with the terminating routine.

Continuing in FIG. 10*c*, the LTM control word is checked at step 991 to determine if it is a "1". Since the content of DGR was a line number, the LTM control word will be "0" and steps 997, 998 and 999 will be executed. Step 997 will update the busy-free line table to reflect the fact that the line number in question is busy to all other callers. Step 998 will set the tone code for the ringing/ringback into the JTR word of the processing register while step 999 will mark the tone indicator TOIND in the bit position that applies to the processing register involved. Steps 993 and 994 perform the same function described in the calling routine and step 995 removes the processing register involved from the NCIND and the NCT routine exits.

The calling sequence just described assumes a line-to-line or locally generated call. A line-to-line call is characterized by a line number in DGR and a junctor number in JTR. A call that originates from other than a local line is handled via a trunk circuit and is termed a trunk-to-line call. A trunk-to-line call is processed in a similar manner as a line-to-line call except that the trunk number involved is modified at step 977 (FIG. 10*a*) to reflect the internal or incoming side of the trunk.

If it is determined that the contents of DGR is not a line number at step 952, the routine interprets the data as being a request for a trunk. The routine recognizes a trunk request by checking bit position 15 in the DGR word. If the position is a "1", the data contained in DGR pertains to a trunk.

The request of a trunk requires that the existing connection between a line and a junctor be released and a new connection be set up between the line and the trunk desired. Since an existing connection must be released, the release queue RELQ is interrogated at steps 960 and 961 to determine if the queue is full. If the queue is full, fast busy tone will be returned at step 971 and the NCIND will be updated at step 973. Under these conditions, the line requesting a trunk is denied service due to the unavailability of equipment at the time of the request.

If the queue is not full, bit position 14 is checked at step 962 to determine if the trunk requested is a dedicated trunk (single trunk number) or if the trunk is a member of a group (two or more trunk numbers) which requires a search or hunting for a free trunk. If trunk hunting is not required, the 8 bit dedicated trunk number is obtained from DGR at step 964 and the LTM control word is marked at step 966. The line number requesting the trunk is retrieved from the equipment in use table at step 968 and the indentity of the line number is stored in an entry of the equipment in use table that is located by the junctor that is presently connected to the line. Using the line number retrieved from this table and the trunk number obtained from DGR, a free link is found by matching the proper AB and BC masks. The matching and detecting of a free link is accomplished at steps 980 through 983.

The availability of the mark and hold control 62 is checked at step 984 and if available, the AB/BC masks are updated at step 990 (FIG. 10c). The LTM control word is checked for a "1" and since the trunk number is being processed by the terminating routine, step 991 will produce a YES. Step 992 is entered and the junctor number of the junctor that is presently connected to the line requesting the trunk is placed in the release queue. The in and out pointers are updated for the release queue and the BFT table is updated to reflect the busy state of the trunk to be used and the processing register is released by placing a "1" in the processing register busy-free indicator BFIND. The line number requesting the trunk is now placed in the equipment in use table along with the free link of the second stage matrix found at step 993. The entry in the equipment in use table is the entry associated with the trunk number. It should be noted that the line number occupies two entries in the equipment in use table, first is an entry associated with a junctor and second is an entry associated with a trunk.

The data required to set up a connection between the trunk and line number is assembled (line number, trunk number, link switch number) and distributed to the mark and hold control 62 at step 994. The NCIND is updated at step 995 and the routine will then exit.

If trunk hunting is required as determined at step 962 to find a free trunk within a group of trunks, the trunk hunting steps designated 963–965 are executed. The data contained in DGR for this case is a special code that contains the first trunk number in the group and the last trunk number in the group. Due to the number of bits in a word, the data received by the terminating routine is in a condensed form. To set up the start and stop trunk numbers, the condensed data is divided into its component parts and expanded to produce two 8 bit trunk numbers, one for the start point and one for the end or stop point. Since a sequential trunk hunting scheme is employed, the first trunk in the group (start point) is checked to determine if it is busy or free by testing its bit position in the BFT. If it is determined at step 965 that the trunk is free, the routine proceeds in the same manner as described for a dedicated trunk number. If the first trunk is not free, the next trunk in the group is tested until a free trunk is found or the stop point (last trunk in the group) is reached. If a trunk cannot be found, a fast busy tone is returned at step 971 and the NCIND is updated at step 973. The routine will now look for more work.

It is claimed:

1. Process for controlling an automatic telephone exchange including a plurality of trunks, junctors and line circuits, and a switching network for effecting the interconnection thereof, comprising the steps of:

storing the current status of all trunks in a first register, storing the busy/free status of all trunks in a second register, sequentially comparing the current status with the busy/free status of all trunks to detect a request for service, storing the busy/free status of all line circuits in a third register, comparing the current status of each line with that stored in said third register to detect a change of condition indicating a request for service, storing in time sequence of receipt the identity of trunks and line circuits requesting service in a fourth register, and processing the requests for service for the trunks and line circuits in the order stored in said fourth register to form communication loops.

2. Process as defined in claim 1, wherein said step of sequentially storing the indentity of trunks and line circuits in said fourth register includes the steps of:

storing a first address of the next location in said fourth register available to receive data, storing a second address of the next location in said fourth register from which data is to be removed, and subsequent to each addition of data to said fourth register, incrementing said first address and comparing said first and second addresses to determine if said fourth register is full.

3. Process as defined in claim 1, further including the step of:

altering the data in said second and third registers upon detection of a request for service from a trunk or a line circuit, respectively, subsequent to the storage of the identity thereof in said fourth register.

4. Process according to claim 1, further including the steps of:

checking at least one communication loop during each successive first time interval to detect a change of condition therein, storing in a fifth register detected changes in condition of a loop, storing in a sixth register the open or closed condition of a loop since a detected change occurred, storing in a seventh register the indication of detection or no detection of a dial impulse in the loop, checking the fifth register at each interval to find a loop which has previously undergone a change, and then checking said sixth register for an open condition in this loop to detect a dial impulse, 5. Process as defined in claim 4, further including the step of:

inserting an indication of a detected dial impulse in said seventh register upon finding in said fifth register a loop that has previously undergone a change and after a first interval has an open loop condition.

6. Process according to claim 1, further including the steps:

checking at least one communication loop during each successive first time interval to detect a change of condition therein, storing in a fifth register detected changes in condition of a loop storing in a sixth register the open or closed condition of a loop since a detected change occurred, storing in a seventh register the indication of detection or no detection of a dial impulse in the loop, checking the fifth register at each interval to find a loop which has previously undergone a change, and then checking said sixth register for a closed condition in this loop and checking said seventh register for an indication of a previous detection of an impulse in this loop to detect a closed line condition after a dial impulse ending during the previous first interval.

7. Process according to claim 1, further including the steps of:

checking at least one communication loop during each successive first time interval to detect a change of condition therein, storing in a fifth register detected changes in condition of a loop storing in a sixth register the open or closed condition of a loop since a detected change occurred, storing in a seventh register the indication of detection or no detection of a dial impulse in the loop, checking the fifth register at each interval to find a loop which has previously undergone a change, and then checking said sixth register for a closed condition in this loop, and checking said seventh register for a previous indication of no detection of an impulse in the loop to detect an undesirable signal in the loop of shorter duration than an impulse.

8. Process according to claim 4, further including the steps of:

storing in an eighth register a time signal representing the start of a second time interval longer than said first intervals at the beginning of each second interval, erasing said time signal from said eighth register in connection with a loop when a change of condition of said loop is recorded in said fifth register, checking said eighth register at the end of each second time interval to determine presence of a time signal, and also checking said sixth register to determine the presence of an open loop condition indicating a release condition 9. Process according to claim 4, further including the steps of:

storing in a ninth register previously detected dialed digits, storing in an eighth register a time signal representing the start of a second time interval longer than said first intervals at the beginning of each second interval, erasing said time signal from said eighth register in connection with a loop when a change of condition of said loop is recorded in said fifth register, checking said eighth register at the end of each second time interval to determine presence of a time signal, and also checking said sixth register to determine the presence of a closed loop condition, and checking said ninth register to determine that a dialed digit is stored therein, indicating an interdigital pause condition.

10. Process according to claim 4, further including the steps of:

storing in a ninth register previously detected dialed digits, storing in an eighth register a time signal representing the start of a second time interval longer than said first intervals at the beginning of each second interval, erasing said time signal from said eighth register in connection with a loop when a change of condition of said loop is recorded in said fifth register, checking said eighth register at the end of each second time interval to determine presence of a time signal, and also checking said sixth register to determine the presence of a closed loop condition, and checking said ninth register to determine that no dialed digit is stored therein, indicating a prolonged off-hook period.

11. Process for controlling an automatic telephone exchange including a plurality of trunks, junctors and line circuits, and switching network having at least first and second stages of links for effecting interconnection thereof comprising the steps of storing the status of said first and second stages of links in first and second registers, respectively, in the order of position thereof in the switching network, storing in a third register the designation of line circuits requesting connection, comparing the data in said first and second registers pertaining to a particular line circuit, the designation of which is stored in said third register, to obtain a free link in a corresponding position of said first and second stages which form a path connectable to said line circuit, storing the busy/free status of all junctors and trunks in a fifth register, wherein the data of said second register compared with the data of said first register relates to a free junctor indicated in said fifth register, and effecting connection of the selected links.

12. Process for controlling an automatic telephone exchange including a plurality of trunks, junctors and line circuits, and switching network having at least first and second stages of links for effecting interconnection thereof, comprising the steps of storing the status of said first and second stages of links in first and second registers, respectively, in the order of position thereof in the switching network, storing in a third register the designation of line circuits requesting connection, comparing the data in said first and second registers pertaining to a particular line circuit, the designation of which is stored in said third register, to obtain a free link in a corresponding position of said first and second stages which form a path connectable to said line circuit, storing the busy/free status of all junctors and trunks in a fifth register, and selecting from said third register, the first line circuit requesting connection and from said fifth register the first available junctor, the data in said first and second registers which is compared relating only to links in said first and second stages of links which are connectable to said selected line circuit and said selected junctor, respectively, and effecting connection of the selected links 13. Process as defined in claim 12 further including the steps of storing in a sixth register line circuit and trunk designations received as requests for connection, storing in a seventh register the busy/free condition of all line circuits, for each line circuit, the designation of which is stored in said sixth register, storing the status of said second stage links connectable to said selected junctor and said first stage links connectable to the designated line circuit, and comparing the stored first and second stage links to obtain a free link in a corresponding position of said first and second stages which form a path connecting said selected junctor and a designated line circuit.

14. Process as defined in claim 13 further including for each trunk, the designation of which is stored in said sixth register, storing the designation of the selected junctor associated with the line requesting the trunk in an eighth register, and sequentially releasing junctors whose dsignation is stored in said eighth register.

15. Process as defined in claim 14 further including for each trunk, the designation of which is stored in said sixth register, storing the states of said second stage links connectable to said trunk and said first stage links connectable to the designated line circuit, and comparing the stored first and second stage links to obtain a free link in a corresponding position of said first and second stages which form a path connecting said trunk and a designated line circuit.

16. System for controlling an automatic telephone exchange including a plurality of trunks, junctors and line circuits, and a switching network for effecting the interconnection thereof, comprising first register means for storing the current status of all trunks, second register means for storing the busy/free status of all trunks, first comparing means operatively associated with said first and second register means for sequentially comparing the current status with the busy/free status of all trunks to detect a request for service, third register means for storing the busy/free status of all line circuits second comparing means for comparing the current status of each line with that stored in said third register means, fourth register means for storing in time sequence of receipt the identity of trunks and line circuits requesting service, and control means for actuating said switching network in connection with the trunks, line circuits and junctors in the order in which the designations are stored in said fourth register means to form communication loops.

17. System as defined in claim 16, further including scanning means for scanning at least one communication loop during each successive first time interval to detect a change in condition therein, fifth register means for storing detected changes in condition of a loop, sixth register means for storing the open or closed condition of a loop after a change occurs in the condition thereof, seventh register means for storing an indication of detection or nondetection of a dial impulse in a loop, and means for scanning said fifth and sixth registers at each interval to detect a loop which has undergone a change in condition and is in an open condition indiating a dial impulse.

18. System as defined in claim 17, further including eighth register means for storing a time signal representing the start of a second time interval longer than said first time intervals at the beginning of each second time interval, and means for erasing said time signal from said eighth register in connection with a loop when a change of condition of said loop is recorded in said fifth register means.

19. System as defined in claim 18, further including ninth register means for storing previously detected dialed digits.

20. System for controlling an automatic telephone exchange including a plurality of trunks, junctors and line circuits, and a switching network having at least first and second stages of links for effecting interconnection thereof, comprising first and second register means for storing the status of said first and second stages of links, respectively, in order of position thereof in the switching network, third register means for storing the designation of line circuits request connection, comparing means for comparing the data in said first and second register means pertaining to a particular line circuit, the designation of which is stored in said third register means, to obtain a free link in a corresponding position of said first and second stages which form a path connectable to said line circuit, fifth register means for storing the busy/free status of all junctors and trunks, means for selecting from said third register means the first line circuit requesting connection and from said fifth register means the first available junctor, the data in said first and second registers which is compared relating only to links in said first and second stages of links which are connectable to said selected line circuit and said selected junctor, respectively, and means for effecting connection of the selected links.

21. System as defined in claim 20 further including sixth register means for storing line circuit and trunk designations received as requests for connection, seventh register means for storing the busy/free condition of all line circuits, means for storing the status of said second stage links connectable of said selected junctor and said first stage links connectable to the designated line circuit for each line circuit the designation of which is stored in said sixth register means, and means for comparing the stored first and second stage links to obtain a free link in a corresponding position of said first and second stages which form a path connecting said selected junctor and a designated line circuit.

22. System as defined in claim 21 further including eighth register means for storing the designation of the selected junctor associated with the line requesting the trunk for each trunk whose designation is stored in said sixth register means, and means for sequentially releasing junctors whose designation is stored in said eighth register means.

* * * * *